United States Patent
Armbruster et al.

(10) Patent No.: US 12,066,321 B2
(45) Date of Patent: Aug. 20, 2024

(54) METHOD FOR DETERMINING THE PATH OF A MEASUREMENT BEAM OF AN INTERFEROMETRIC MEASURING DEVICE, AND MEASURING DEVICE FOR INTERFEROMETRIC MEASUREMENT OF AN OBJECT UNDER MEASUREMENT

(71) Applicant: Polytec GmbH, Waldbronn (DE)

(72) Inventors: Bernd Armbruster, Karlsruhe (DE); Matthias Schussler, Waldbronn (DE); Bernd Heinen, Karlsruhe (DE)

(73) Assignee: Polytec GmbH, Waldbronn (DE)

( * ) Notice: Subject to any disclaimer, the term of this patent is extended or adjusted under 35 U.S.C. 154(b) by 694 days.

(21) Appl. No.: 17/251,875

(22) PCT Filed: Jun. 5, 2019

(86) PCT No.: PCT/EP2019/064708
§ 371 (c)(1),
(2) Date: Dec. 14, 2020

(87) PCT Pub. No.: WO2019/238505
PCT Pub. Date: Dec. 19, 2019

(65) Prior Publication Data
US 2021/0255030 A1    Aug. 19, 2021

(30) Foreign Application Priority Data

Jun. 15, 2018 (DE) .................... 10 2018 114 478.4

(51) Int. Cl.
*G01H 9/00* (2006.01)
*G01B 11/25* (2006.01)
(Continued)

(52) U.S. Cl.
CPC ............... *G01H 9/00* (2013.01); *G01B 11/25* (2013.01); *G01S 17/58* (2013.01); *G01S 17/894* (2020.01)

(58) Field of Classification Search
CPC ......... G01H 9/00; G01S 17/58; G01S 17/894; G01B 11/161
See application file for complete search history.

(56) References Cited

U.S. PATENT DOCUMENTS 6,711,293 B1    3/2004 Lowe
8,899,115 B2    12/2014 Boyer et al.
(Continued)

FOREIGN PATENT DOCUMENTS

DE    102007023826    11/2008
DE    102012211549    7/2013
(Continued)

OTHER PUBLICATIONS https://en.wikipedia.org/wiki/Structure_from_motion, (admitted prior art) accessed Dec. 8, 2020.
(Continued)

*Primary Examiner* — Dominic J Bologna
*Assistant Examiner* — Roberto Fabian, Jr.
(74) *Attorney, Agent, or Firm* — Volpe Koenig

(57) ABSTRACT

A method for determining the path of a measurement beam of an interferometric measuring device, includes A. recording a plurality of spatially resolved images of the object under measurement; B. creating a three-dimensional model of the object under measurement; C. providing a beam-position image-recording unit and recording at least one spatially resolved beam-position-determining image; D. determining the spatial position and orientation of the beam-position image-recording unit relative to the object under measurement; E. providing a spatial relation between the spatial path of the measurement beam of the interferometric measuring device and the position and orientation of the beam-position image-recording unit; F. determining the spatial path of the measurement beam of the interferometric measuring device relative to the object under measurement. A measuring device for interferometric measurement of an object under measurement is also provided.

14 Claims, 7 Drawing Sheets

(51) Int. Cl.
*G01S 17/58* (2006.01)
*G01S 17/894* (2020.01)

(56) References Cited

U.S. PATENT DOCUMENTS

| | | | |
|---|---|---|---|
| 9,551,726 B2 | 1/2017 | Schussler et al. | |
| 2008/0291466 A1 | 11/2008 | Schuessler et al. | |
| 2009/0086199 A1 | 4/2009 | Troy et al. | |
| 2012/0266680 A1* | 10/2012 | Boyer | G01B 11/2545 73/655 |
| 2013/0312529 A1* | 11/2013 | Park | G01H 9/00 73/657 |

FOREIGN PATENT DOCUMENTS

| | | | |
|---|---|---|---|
| DE | 102012211549 B3 * | 7/2013 | ......... G01B 9/02082 |
| DE | 102009049932 B4 | 4/2016 | |
| WO | 2007065643 A1 | 6/2007 | |

OTHER PUBLICATIONS

Marius Muja and David G. Lowe, "Fast Approximate Nearest Neighbors with Automatic Algorithm Configuration", in International Conference on Computer Vision Theory and Applications, 10 pages (VISAPP'09), 2009.

H. Tjaden, U. Schwanecke, E. Schoemer: "Real-Time Monocular Pose Estimation of 3D Objects Using Temporally Consistent Local Color Histograms". 2017 IEEE International Conference on Computer Vision (ICCV), Venice, pp. 124-132, 2017.

Sels, Seppe et al. "3D model assisted fully automated scanning laser Doppler vibrometer measurements". Opitcs and Lasers in Engineering, vol. 99, pp. 23-30, 2017.

* cited by examiner

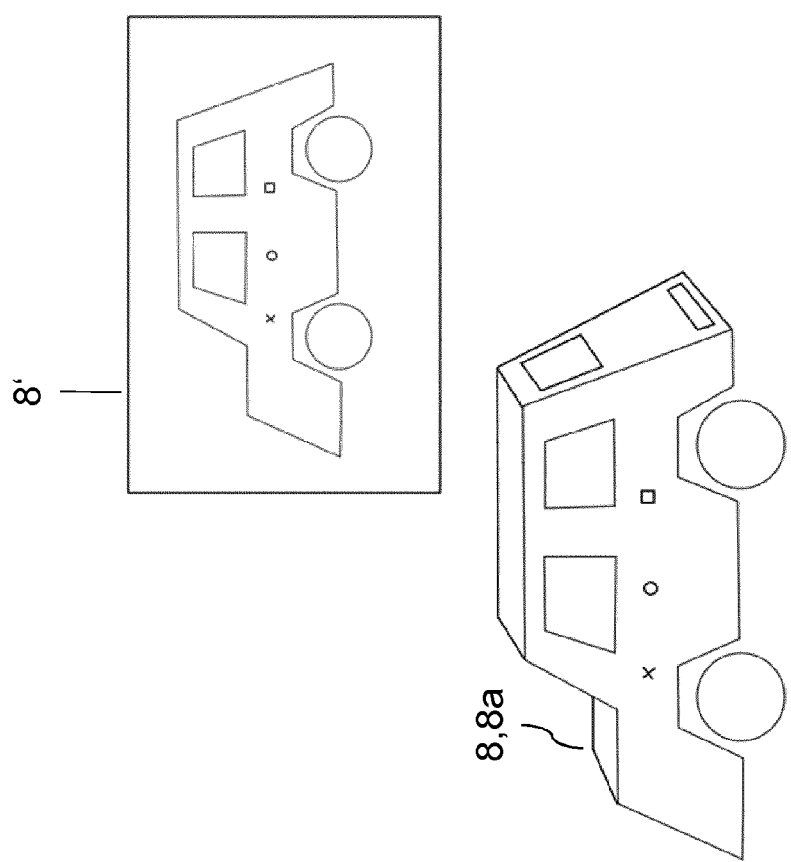

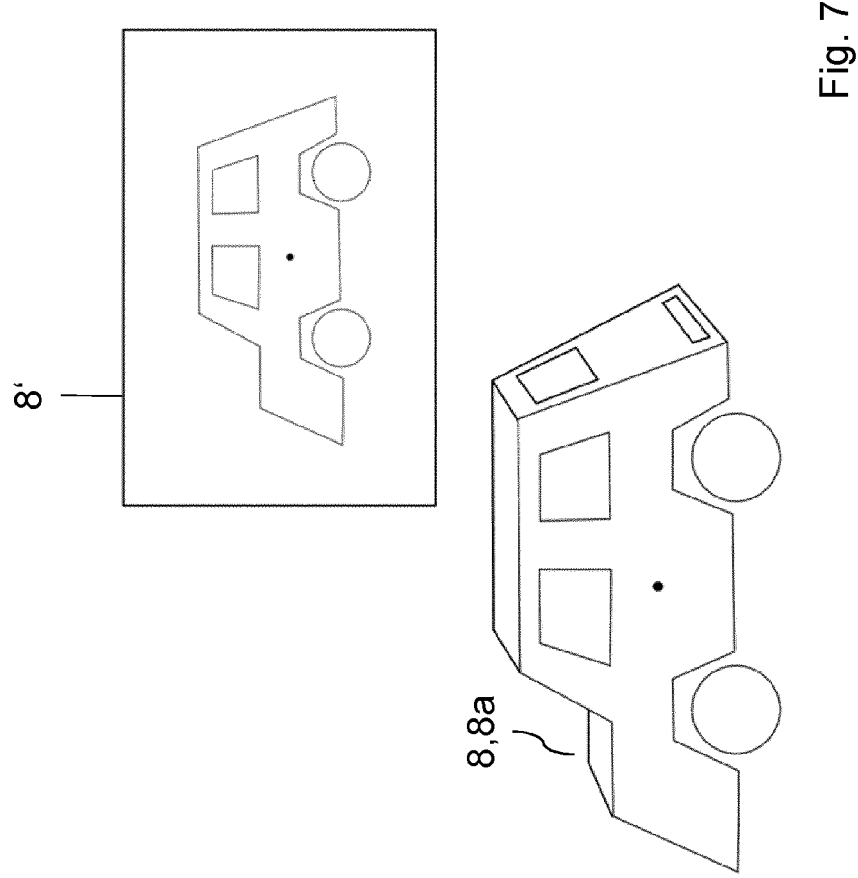

METHOD FOR DETERMINING THE PATH
OF A MEASUREMENT BEAM OF AN
INTERFEROMETRIC MEASURING DEVICE,
AND MEASURING DEVICE FOR
INTERFEROMETRIC MEASUREMENT OF
AN OBJECT UNDER MEASUREMENT

TECHNICAL FIELD

The invention relates to a method for determining the beam path of a measurement beam of an interferometric measurement apparatus and to a measurement apparatus for interferometric measurement of a measurement object.

BACKGROUND

Measurement apparatuses which have a beam source, preferably a laser beam source, a detector, a beam splitter and an evaluation unit are known for performing interferometric measurements on a measurement object. Here, an original beam generated by the radiation source is split into a measurement beam and a reference beam by the beam splitter. The measurement beam is guided to at least one measurement point on the measurement object and the measurement beam, which has been at least partially reflected or scattered by the measurement object, is superimposed with the reference beam on a detection surface of the detector such that a superimposition or interference signal between measurement beam and reference beam is measurable by the detector.

In order to capture vibration data from measurement objects, such measurement apparatuses are embodied as vibrometers, preferably as laser Doppler vibrometers. The frequency of the measurement beam is influenced by the movement or vibration of the object surface, and so conclusions can be drawn about the movement of the object, in particular the vibration frequency of the object surface, from the superimposition signal of the measurement and reference beam.

For a multiplicity of measurement situations, it would be desirable to determine not only the vibration frequency or vibration amplitude but also the direction of the vibration in the vibration data. By contrast, an interferometric measurement apparatus always records the vibration in the direction of the measurement beam when the measurement beam scattered or reflected by the measurement object runs back into itself (i.e., the optical axis of the measurement beam running toward the measurement object and the optical axis of the measurement beam returning from the measurement object are identical) and in the direction of the angle bisector if the measurement beam scattered or reflected by the measurement object runs back at an angle to the incident measurement beam (and hence the optical axis of the measurement beam running toward the measurement object and the optical axis of the measurement beam returning from the measurement object include this angle).

Usually, interferometric measurement apparatuses in which the measurement beam scattered or reflected by the measurement object runs back into itself or virtually runs back into itself are used for vibration measurements. For these interferometric measurement apparatuses, it is therefore desirable to determine the beam path of the optical axis of the measurement beam running toward the object, in particular the angle of incidence of the measurement beam on the object at the measurement point, as the beam path of the measurement beam.

For interferometric measurement apparatuses in which the incident and returning measurement beams are at an angle to one another, it is accordingly desirable to determine the profile of the angle bisector at the measurement point, through which the incident beam and the returning beam and the angle bisector run, in particular the angle of the angle bisector relative to the object at the measurement point.

The term "beam path of the measurement beam" or "determination of the beam path of the measurement beam" thus designates here, and in the following, the path relevant to the measurement carried out by the measurement beam. The beam path therefore preferably contains the optical axis of the measurement beam running toward the measurement object, but equivalent information items can also be determined, in particular information items relating to an angle bisector as described above. To simplify the description in the present application, the following always refers to the beam path of the measurement beam, its angle of incidence, etc., but this always also includes equivalent information items, such as, e.g., the aforementioned angle bisector, instead of the measurement beam.

It is often desired to determine the vibration in the direction of the surface normal of a surface surrounding the measurement point. Using the angle of incidence, it is then possible to calculate the vibration component in the direction of the surface normal. Measuring systems that direct a plurality of measurement beams at a measurement point from different directions are also common. On the basis of the beam paths of the beams, in particular laser beams, used for the measurement, the direction-dependent vibration can then be calculated via a transformation matrix; this is generally also referred to as a 3D measurement of a vibration. For this reason, it is very important to precisely capture the paths of the beam.

SUMMARY

The present invention is therefore based on the object of allowing the user to determine the beam path of a measurement beam of an interferometric measurement apparatus in a simplified manner.

This object is achieved by a method and by a measurement apparatus having one or more features described herein. Advantageous embodiments can be found below and in the claims.

The method according to the invention is preferably designed to be carried out by the measurement apparatus according to the invention, in particular an advantageous embodiment thereof. The measurement apparatus according to the invention is preferably embodied to carry out the method according to the invention, in particular an advantageous embodiment thereof.

The method according to the invention for determining the beam path of a measurement beam of an interferometric measurement apparatus includes the following method steps:

In a method step A, a plurality of spatially resolved measurement object images of at least one measurement surface of the measurement object are recorded from different perspectives. In a method step B, a three-dimensional measurement object model which comprises at least the measurement surface of the measurement object is created by the plurality of spatially resolved images of the measurement surface. In a method step C, a relative beam position image recording unit is provided and at least one spatially resolved relative beam position determination image of at least the measurement surface of the measurement object is recorded with the aid of the relative beam position image recording unit. In a method step D, the spatial position and orientation of the relative beam position image recording unit is determined relative to the measurement object with the aid of the at least one spatially resolved relative beam position determination image in combination with the three-dimensional measurement object model and/or the plurality of spatially resolved measurement object images. In a method step E, a spatial relation is provided between the spatial beam path of the measurement beam of the interferometric measurement apparatus and the position and orientation of the relative beam position image recording unit. In a method step F, the spatial beam path of the measurement beam of the interferometric measurement apparatus is determined relative to the measurement object on the basis of the relation provided in method step E and the spatial position and orientation of the relative beam position image recording unit relative to the measurement object.

The measurement apparatus according to the invention for interferometric measurement of a measurement object comprises one or more beam sources for generating at least one measurement beam and at least one reference beam, a detector and an evaluation unit. The measurement beam is guided to at least one measurement point on the measurement object and the measurement beam, which has been at least partially reflected or scattered by the measurement object, is superimposed with the reference beam on a detection surface of the detector such that a superimposition or interference signal between measurement beam and reference beam is measurable by the detector.

Preferably, the measurement apparatus comprises a beam source, in particular a laser beam source, and at least one beam splitter. In this preferred embodiment, an original beam generated by the beam source is split into the at least one measurement beam and at least one reference beam by the beam splitter. The beam source is consequently preferably embodied as a laser beam source; the original beam is therefore preferably a laser beam.

The frequency of the measurement beam is influenced by the movement or vibration of the object surface, and so conclusions can be drawn about the movement of the object, in particular the vibration frequency of the object surface, from the superimposition signal of the measurement and reference beam.

The measurement apparatus is consequently embodied as an interferometric measurement apparatus. The measurement apparatus is preferably embodied as a vibrometer, in particular as a laser Doppler vibrometer.

What is essential is that the measurement apparatus has a relative beam position image recording unit and the evaluation unit is designed to determine the beam path of the measurement beam.

In particular, the measurement apparatus is advantageously embodied to

A. record a plurality of spatially resolved measurement object images of at least one measurement surface of the measurement object from different perspectives;

B. create a three-dimensional measurement object model which comprises at least the measurement surface of the measurement object by the plurality of spatially resolved images of the measurement surface;

C. record at least one spatially resolved relative beam position determination image of at least the measurement surface of the measurement object with the aid of the relative beam position image recording unit;

D. determine the spatial position and orientation of the relative beam position image recording unit relative to the measurement object with the aid of the at least one spatially resolved relative beam position determination image in combination with the three-dimensional measurement object model and/or the plurality of spatially resolved measurement object images;

E. provide a spatial relation between the spatial beam path of the measurement beam of the measurement apparatus and the position and orientation of the relative beam position image recording unit;

F. determine the spatial beam path of the measurement beam of the measurement apparatus relative to the measurement object on the basis of the relation provided in method step E and the spatial position and orientation of the relative beam position image recording unit relative to the measurement object.

The measurement apparatus preferably comprises at least one measuring head: The measuring head of the measurement apparatus represents an element of the measurement apparatus from which the measurement beam emerges. The scope of the invention includes the entire measurement apparatus being integrated in the measuring head; in particular, the measuring head in a preferred embodiment comprises the beam source for the measurement beam, in particular a laser, optical means for forming an interferometer, preferably with a measurement and a reference beam, in particular a Mach-Zehnder interferometer, and the at least one detector and the evaluation unit. Likewise, the scope of the invention includes the measuring head comprising only a subset of the elements of the measurement apparatus; in particular, the evaluation unit can be arranged outside the measuring head. The beam source can likewise be arranged outside the measuring head. In this case, the measurement apparatus preferably comprises at least one light guide for guiding the measurement beam from the radiation source to the measuring head. The interferometer can likewise be arranged outside the measuring head. In this case, the interferometer is preferably connected to the measuring head by at least one light guide in order to guide the measurement beam to the measuring head and to guide the measurement beam reflected and/or scattered on the measurement object, which measurement beam re-enters the measuring head, to the interferometer.

The evaluation unit preferably comprises electronic components for data processing, in particular a processor and a data memory. The evaluation unit is preferably embodied as a computer. The computer can be embodied as a component, known per se, for signal evaluation, in particular as an FPGA decoder. The computer can likewise comprise one or more data processing elements, in particular electronic components, such as one or more computers, decoders, memory components or further components.

Using the method according to the invention and the measurement apparatus according to the invention, the beam path of the measurement beam can be determined, with use being made of the three-dimensional model, created in method steps A and B, of at least the measurement surface of the measurement object. This results in a considerable simplification for the user, since method step A can be carried out by the user in an uncomplicated manner and, on the basis thereof, the beam path can be determined in automated fashion.

The beam path consequently reflects the position and propagation direction of the beam. Therefore, the beam path is preferably determined at least by specifying a location on the optical axis of the beam and, furthermore, at least one propagation direction of the beam and/or a second location on the optical axis of the beam, which differs from the first location.

The beam path thus provides further information items, in particular the angle of incidence of the measurement beam at the measurement point of the object in the three-dimensional model, i.e., in a coordinate system of the measurement object, and so there can be additional processing of the measurement data on the basis of the data of the beam path.

Recording the spatially resolved images from different perspectives in method step A facilitates a much more precise creation of a three-dimensional measurement object model: Spatial coordinates in two dimensions can be determined in many measurement situations from recordings of a spatially resolved image from just one perspective. However, precisely determining a three-dimensional model is relevant, in particular, for the present invention, in particular in order to determine the spatial position and orientation of the relative beam position image recording unit in method step D. Here, the invention has the particular advantage that, as a result of the recording of spatially resolved images from different perspectives in method step A, the three-dimensional model according to method step B facilitates a significantly higher accuracy. This also makes the determination of the beam path correspondingly more accurate. The design of method step A according to the invention by the recording of spatially resolved images from different perspectives consequently forms the basis for a user-friendly and precise determination of the beam path.

A three-dimensional model of at least the measurement surface of the measurement object is available after method step B has been carried out. It is consequently not necessary for the user to carry out their own measurements or specify certain reference points manually. Likewise, it is not mandatory to additionally specify three-dimensional models created elsewhere, such as CAD models.

The present invention is based on the discovery that a three-dimensional measurement object model, created by a plurality of spatially resolved measurement object images, can advantageously be combined with the spatially resolved image of a relative beam position image recording unit in order to determine the beam path of the measurement beam: Even if the spatial relationship between a relative beam position image recording unit and the measurement beam, or at least fastening points of a measuring head, is known in already known interferometric measurement apparatuses, there is at best the possibility of obtaining information about the beam path relative to the position and orientation of the image recording unit; however, the relationship to the measurement object, in particular to a coordinate system of the measurement object, is missing. This relationship can be established by determining the spatial position and orientation of the relative beam position image recording unit relative to the measurement object with the aid of the at least one spatially resolved relative beam position determination image in combination with the three-dimensional measurement object model and/or the plurality of spatially resolved measurement object images, and so the invention facilitates the determination of the beam path in the coordinate system of the measurement object model in a manner requiring little user outlay.

In method step A, a plurality of spatially resolved measurement object images of at least one measurement surface of the measurement object are recorded from different perspectives. The plurality of spatially resolved measurement object images can be recorded by one or more image recording units. In an advantageous embodiment, the plurality of spatially resolved images are recorded by a movable image recording unit, in particular an image recording unit that is moved by the user.

Digital cameras, in particular cameras with a CCD or CMOS image sensor, are preferably used as the image recording unit, particularly in method step A and/or C. The scope of the invention also includes the case of creating the respective location-triggered image by a scanning method: The scope of the invention thus includes the use of an image recording unit in which individual points of the object to be imaged are recorded in succession and a spatially resolved image is constructed from a plurality of separately recorded points, for example by a computer.

The image recording unit can also comprise an illumination unit which illuminates the measurement object while the image recording unit records images. Thus, image recording units for capturing the three-dimensional shape of an object, which comprise a pattern projection unit, in particular a stripe projection unit and a camera, typically a black-and-white camera, are known, wherein the camera is used to accurately capture a light pattern projected on the object by the projection unit. Preferably, such an image recording unit is used to carry out method step A.

Particularly preferably, the image recording unit also comprises a color camera for recording a color image in order to assign a realistic, in particular colored and/or textured image representation of the actual surface of the model to the surface of a created three-dimensional model of the object. The use of such image recording units is particularly advantageous for carrying out method step A.

Advantageously, use is therefore made of an image recording unit which, as described above, comprises a projection unit for projecting a pattern, in particular a stripe pattern, on the object and an assigned camera, in particular a black-and-white camera. A spatially resolved image is consequently captured with this camera when the pattern is projected, and so a three-dimensional model can be created from the plurality of spatially resolved images in a manner known per se, in particular according to the method of structured light projection. A further camera, in particular a color camera as described above, is preferably used to additionally record a further camera image, in particular a color image, for recording the texture of the object, preferably without a stripe projection taking place, this further camera image being recorded simultaneously with a spatially resolved image, or at a short time interval thereafter. In particular, it is consequently particularly advantageous to alternately record a spatially resolved image with stripe projection and, in particular at a short time interval thereafter, a color image without projection of the stripe pattern: The above-described image recording unit records both images with projected stripes and images without the stripes in quick succession. The images without the stripes contain the spatially resolved appearance of the measurement object (texture). Supported by the brief time interval between the recordings, the 3D coordinates determined by the stripe projection can each be assigned pixels of the texture.

Conversely, 3D coordinates can be assigned to a pixel of the texture.

In this way, texture information, which corresponds to the actual optical impression of the surface of the model, can therefore also be assigned to the three-dimensional model. On account of the short time interval, the perspective and position of the image recording unit in the case of the images recorded simultaneously or in quick succession are identical or only slightly different, even if, for example, the user, using a hand-held model, moves the latter relative to the object.

The use of image recording units which comprise a plurality of spatially resolved image detectors is also within the scope of the invention, with the spatially resolved image of the image recording unit being created by suitable combination of the image information from the plurality of image detectors.

In method step B, a three-dimensional measurement object model which comprises at least the measurement surface of the measurement object is created by the plurality of spatially resolved images of the measurement surface as per method step A. The creation is preferably implemented by the use of photogrammetry.

Photogrammetric methods are known per se from geodesy and remote sensing. In the meantime, however, photogrammetry is also used to ascertain the spatial position and/or the three-dimensional shape of an object by a plurality of spatially resolved measurement images.

The object mentioned at the outset is thus also achieved through the use of photogrammetry to determine the beam path of a measurement beam of an interferometric measurement apparatus.

To facilitate a precise determination of the three-dimensional model, the spatially resolved images are preferably captured in such a way that, at least in the edge regions, there is an overlap with the respective subsequent image. On account of the typical size of the measurement objects for which the method according to the invention is used, the use of processes of close-range photogrammetry, in particular, is advantageous:

One possible embodiment is the determination of unambiguous features in the spatially resolved images and the subsequent triangulation of coordinates. Identifiable features are determined in the spatially resolved images by scale-invariant feature transform SIFT, in particular according to U.S. Pat. No. 6,711,293 B1, speeded-up robust features SURF and similar relevant known methods. These features are searched for in a plurality of the spatially resolved images and assigned to one another. The assignment is carried out by an algorithm that determines roughly matching neighbors for the features in a multidimensional space spanned by the feature vectors (SIFT, SURF, etc.). Examples of this are simple trial and error (brute force) or the Fast Library for Approximate Nearest Neighbor Search (FLANN: Marius Muja and David G. Lowe, "Fast Approximate Nearest Neighbors with Automatic Algorithm Configuration", in International Conference on Computer Vision Theory and Applications (VISAPP'09), 2009). Other methods are also conceivable. Based on the imaging properties of the image recording unit used, the perspectives of the images can then be calculated and coordinates can be ascertained on the basis of the feature correspondences, preferably by triangulation. Carrying out this coordinate ascertainment multiple times results in a plurality of 3D coordinates, which are combined to form a model. This corresponds to method step B. An overview of this and other available such methods can also be found at https://en.wikipedia.org/wiki/Structure_from_motion.

Another possible embodiment here is the use of the aforementioned pattern projection known per se, preferably in the embodiment of a stripe projection. In the case of the pattern projection, the time-consuming search for the matching neighbors in a plurality of the spatially resolved images is dispensed with, and the triangulation can be implemented on the basis of the known relationship between the pattern projection unit and camera. Here, too, a plurality of 3D coordinates are obtained, which are combined to form a model in accordance with method step B. Movable measurement apparatuses for recording a plurality of spatially resolved images of an object and creating a three-dimensional model are already commercially available. In addition to a recording unit, in particular a camera, for capturing the spatially resolved image, these image recording units typically also comprise a projection unit for projecting a pattern, in particular for projecting stripes for the method of structured light projection.

One of the commercially available 3D scanners specified below is preferably used to this end (the names specified below are trade names whose rights reside with the respective proprietors): Artec Eva, Artec Spider, Creaform GoScan 3D, Creaform Handyscan 3D, Creaform Metrascan 3D.

In method step C, a relative beam position image recording unit is provided and at least one spatially resolved relative beam position determination image of at least the measurement surface of the measurement object is recorded with the aid of the relative beam position image recording unit. In principle, any image recording unit whose spatial relation to the beam path of the measurement beam can be provided in accordance with method claim E, which is explained in more detail below, in particular any one of the above-described image recording units, can be used as a relative beam position image recording unit.

Measurement apparatuses for interferometric measurement of an object, which already comprise an image recording unit, are known. By way of example, such an image recording unit is used to facilitate a view of the measurement surface on a screen of the measurement apparatus for the user. Such image recording units are typically connected to the measurement apparatus; in particular, measurement apparatuses in which one or more measuring heads and an image recording unit are arranged on a common holding apparatus are known. It is therefore advantageous to use such an image recording unit as a relative beam position image recording unit.

In method step D, the spatial position and orientation of the relative beam position image recording unit is determined relative to the measurement object with the aid of the at least one relative beam position determination image in combination with the three-dimensional measurement object model and/or the plurality of spatially resolved measurement object images.

As described above, the present invention is based on the basic principle of the beam path being determinable in a coordinate system of the spatially resolved measurement object model with the aid of a spatial relationship between, firstly, the relative beam position image recording unit relative to the measurement object and, secondly, the beam path relative to the relative beam position image recording unit.

In method step D, a first step in this respect is implemented using the spatially resolved relative beam position determination image and the three-dimensional measurement object model and/or the plurality of spatially resolved measurement object images.

This is preferably implemented by comparing the relative beam position determination image with views from different perspectives calculated using the three-dimensional measurement object model. As a result of this, the recording location and recording direction of the relative beam position determination image, and hence the position and orientation of the relative beam position image recording unit, can be determined in automated fashion in the three-dimensional measurement object model. Consequently, it is possible, in particular, to assign to the relative beam position image recording unit coordinates in the coordinate system of the measurement object model:

The determination of relative position and orientation of a three-dimensional model in a spatially resolved image is known from the prior art, for example from: DOI: 10.1109/ICCV.2017.23. The relative position and orientation, which are known in that case, can be used to determine for each picture element of the associated spatially resolved image whether it represents a part of the surface of the three-dimensional model. Should it represent a part of the surface of the three-dimensional model, the closest known 3D coordinates of the surface of the three-dimensional model can be determined and the 3D coordinates of the part of the surface that is represented in the respective picture element of the spatially resolved point can be determined by suitable interpolation. In any case, determining the relative position and orientation of the three-dimensional measurement object model in a spatially resolved image then also allows the assignment of the associated 3D coordinates in the three-dimensional measurement object model to each location, in particular to each picture element of the spatially resolved image, in particular an image of the relative beam position image recording unit. Further advantageous embodiments are shown in FIGS. 6 and 7 and explained in the associated descriptions of the figures.

Conversely, the described method naturally also allows the determination of the recording location and recording direction of the image recording unit, which has recorded the spatially resolved image, relative to the three-dimensional model; in the specific case, this determines the position and orientation of the relative beam position image recording unit relative to the three-dimensional measurement object model.

Here, where necessary, method step D can comprise the fitting of a measurement object alignment model, for example from CAD or FE data, to the measurement object model according to any one of the methods described below in conjunction with method step E, with this alignment model, which has been fitted in terms of its relative position and orientation to the measurement object model, then being used in place of or in addition to the latter for the purposes of identifying the position and orientation of the relative beam position image recording unit relative to the measurement object and/or for the purposes of determining the assignment rule between positions on spatially resolved images of the relative beam position image recording unit and the associated points in the three-dimensional measurement object model. This allows even more accurate results to be achieved in some cases.

In method step E, a spatial relation is provided between the spatial beam path of the measurement beam of the interferometric measurement apparatus and the position and orientation of the relative beam position image recording unit.

The spatial relation between two objects here denotes a spatial relationship in which parameters that are still unknown may exist. In contrast to a spatial relationship between two objects, the specification of which immediately facilitates the determination of a coordinate transformation between a coordinate system of the first object and a coordinate system of the second object, and hence the representation of both objects in the same coordinate system, the spatial relation between two objects may initially also contain yet to be determined parameters, the determination of which, however, is necessary to in fact ultimately be able to carry out a coordinate transformation between the coordinate systems of the two objects or to facilitate the representation of both objects in the same coordinate system.

By way of example, a relation can specify the spatial orientation of two objects with respect to one another, the distance between the two objects, however, only being contained in the relation as a parameter yet to be determined. Then, the distance needs to still be additionally determined for the purposes of a complete coordinate transformation. Likewise, a relation may specify the positions of two objects in a common coordinate system but leave the orientation of the two objects with respect to one another undetermined. In this example, parameters yet to be determined can be, for example, angles of rotation about two mutually perpendicular axes, which describe the orientation of the second object relative to the first object. In this case, too, it is consequently necessary to determine these parameters such as the angle of rotation in order to be able to set a coordinate transformation or in order to facilitate the representation of both objects in the same coordinate system.

In method step E, the spatial relationship between the beam path and the position and orientation of the relative beam position image recording unit can be provided directly as the spatial relation. However, it is also possible to provide a spatial relation which, on its own, does not yet represent a spatial relationship, as it contains initially still undetermined parameters. Only after ascertaining these initially still undetermined parameters of the spatial relation is there a spatial relationship, and a spatial association can then be made between the spatial beam path of the measurement beam of the interferometric measurement apparatus and the position and orientation of the relative beam position image recording unit. At least one spatial relation is preferably provided, which has only one or two parameters that have yet to be determined and that cannot be determined in a simple manner by calibration or by providing a measurement apparatus for their direct ascertainment, as will be described below.

In one advantageous embodiment, the measurement apparatus has a beam directing unit for directing the measurement beam at a plurality of spatially different measurement points. By way of example, if the position and orientation of the beam directing unit, in particular of a housing of the measurement apparatus, are known, in this advantageous embodiment, the beam direction of the measurement beam is consequently nevertheless unknown since the latter is selectively changeable by specifying control parameters at the beam directing unit.

In particular, the beam directing unit preferably comprises at least one, particularly preferably two movable optical mirrors for bringing the measurement beam into positions corresponding to the desired measurement point by moving the mirrors by way of specifying the control parameters.

For typical beam directing units it is possible to specify a location, which is always located on the optical axis of the measurement beam or which is always in specified fashion spatially related thereto. By way of example, this can be a point on a deflection mirror of the beam directing unit or on an axis of rotation of a deflection unit.

Even if the beam direction of the measurement beam consequently changes on the basis of the control parameters in order for the measurement beam to impinge upon a desired measurement point, it is nevertheless possible in the described preferred embodiment to specify a relation between the spatial beam path of the measurement beam of the interferometric measurement apparatus and the position and orientation of the relative beam position image recording unit as per method step E. In particular, typical beam directing units have two degrees of freedom, for example the deflection of the measurement beam in an x-direction and in a y-direction perpendicular thereto. Consequently, typical beam directing units are controlled by two independent control parameters. Consequently, the beam path is preferably specified as a function of two parameters to be determined, as described above by the relation, the two parameters to be determined being the control parameters or quantities corresponding thereto.

So-called calibrated beam directing units are known, in which an association between the control parameters and the assigned beam path of the measurement beam relative to the beam directing unit is already specified.

If, in this case, the spatial relationship between the beam directing unit and the relative beam position image recording unit is also known, it is also possible to use the known control parameters to specify a fixed relative spatial position of the beam path relative to the spatial position and orientation of the relative beam position image recording unit, for example by the evaluation unit. In this case, there is therefore a spatial relationship and no further parameters need to be determined in order to establish a spatial relationship between the relative beam position image recording unit and the beam path of the measurement beam, in particular to specify the beam path of the measurement beam in a coordinate system of the relative beam position image recording unit.

Accordingly, there are also beam directing units in which the beam direction can be determined using additional measurement apparatuses, for example position or angle measurement apparatuses that measure travel paths or tilt angles. In this case, using the measurement values of these measurement apparatuses, a fixed relative spatial position of the beam path relative to the spatial position and orientation of the relative beam position image recording unit and/or the beam directing unit can be specified. Here, too, no further parameters need to be determined in order to establish a spatial relationship between the relative beam position image recording unit and the beam path of the measurement beam; where necessary, a known spatial relationship between the beam directing unit and the relative beam position image recording unit is used here again.

Calibrated beam directing units are also conceivable, in which, moreover, additional parameters as described are determined by additional measurement apparatuses and are used to determine the beam path. In this case, again by the control parameters and using the measurement values of the additional measurement apparatuses, a fixed relative spatial position of the beam path relative to the spatial position and orientation of the relative beam position image recording unit can be specified. Here, too, no further parameters need to be determined in order to be able to establish a spatial relationship between the relative beam position image recording unit and the beam path of the measurement beam.

However, the method according to the invention is not restricted to calibrated beam directing units or beam directing units with additional measurement apparatuses for the direct ascertainment of otherwise unknown parameters.

The method according to the invention can even be applied in those beam directing units in which an assignment of control parameters to the beam path is not known and also not possible in a simple manner with the means that are usually available. In particular, the method according to the invention allows even one or two beam parameters that are otherwise not determined or determinable to be ascertained, as described in method step F below.

Even in the case of a measurement apparatus with a beam directing unit as described above, in which only a spatial relation between the spatial beam path of the measurement beam of the interferometric measurement apparatus and the position and orientation of the relative beam position image recording unit is provided in method step E, which relation is still dependent on one or two parameters to be determined, the spatial beam path of the measurement beam of the interferometric measurement apparatus can consequently be determined relative to the measurement object by the method according to the invention.

In method step E, the spatial relation is advantageously specified as a spatial relationship, in particular as a fixed relative spatial position of the beam path relative to the spatial position and orientation of the relative beam position image recording unit. In this advantageous embodiment, the arrangement of the measurement beam relative to the relative beam position image recording unit is therefore known and can be specified in a simple manner. Consequently, no further parameters need to be determined in this advantageous embodiment. It is particularly advantageous here if the position and orientation of the relative beam position image recording unit and the beam path are specified in a common coordinate system.

The measurement apparatus according to the invention advantageously comprises a relative beam position image recording unit which is fixedly connected to the interferometric measurement apparatus, in particular to a measuring head of the interferometric measurement apparatus. As a result, the spatial relationship between the position and orientation of the relative beam position image recording unit and the beam path of the measurement beam can be determined and specified once.

Measurement apparatuses in which the spatial relationship between the measurement beam path and the position and orientation of the relative beam position image recording unit is fixedly specified are disadvantageous in that the user has to move the entire measurement apparatus in order to direct the measurement beam at a desired point.

In an advantageous embodiment, the relative beam position image recording unit and at least one measuring head of the interferometric measurement apparatus are arranged on a common holding apparatus, the measuring head being pivotable in one or two axes relative to the relative beam position image recording unit and/or displaceable relative to the relative beam position image recording unit.

The user can thus obtain a desired beam alignment by rotating and/or displacing the measuring head. The measurement apparatus advantageously has one or more position or angle detectors which detect the position of the measuring head selected by the user, in particular one or more angles of rotation and/or one or more displacement positions. The evaluation unit is connected to the detector or detectors and embodied to ascertain the missing information on the basis of measurement signals from the detector or detectors, in particular a displacement position and/or a tilt position of a measuring head relative to the holding apparatus and/or the relative beam position image recording unit. In this advantageous embodiment, too, no additional determination of parameters is therefore necessary, since a spatially fixed relationship between the measuring beam path and the position and orientation of the relative beam position image recording unit is able to be determined on the basis of the values of the position or angle detectors.

A provision of the spatial relation in method step E is preferably implemented by a measurement apparatus model, which preferably includes at least the position and orientation of the relative beam position image recording unit relative to the beam path of the measurement beam. A measurement apparatus model is thus advantageously provided in those cases in which the spatial relation between the position and orientation of the relative beam position image recording unit relative to the beam path of the measurement beam is not known. This may be the case if the spatial conditions are fundamentally unknown or if units with known dimensions are used but there are adjustment options for the user.

In method step E, a measurement apparatus model is provided in this advantageous embodiment, which model comprises at least one measuring head element of a measuring head of the interferometric measurement apparatus, said measuring head element being in specified fashion spatially related to the measurement beam and comprising at least one relative beam position image recording unit element which is in specified fashion spatially related to the relative beam position image recording unit.

The measurement apparatus model can be used to provide a spatial relation, in particular a spatial relationship, between the spatial beam path of the measurement beam of the interferometric measurement apparatus and the position and orientation of the relative beam position image recording unit. The measurement apparatus model is thus used to facilitate an assignment of geometric data of the measurement beam to the spatial position and orientation of the relative beam position image recording unit.

Examples of measuring head elements and an assigned specified relationship to the measurement beam are listed below as preferred embodiments of method step E:

| Measuring head element | Specified relationship/relation |
|---|---|
| Exit opening of the measuring head for the measurement beam, for example the edge of the exit opening, which is defined by a circle. | Position of the measurement beam exit within the exit opening. |
| Exit opening of the measuring head for the measurement beam, for example the edge of the exit opening, which is defined by a circle. | Direction vector of the measurement beam based on a normal to the plane, which is defined by the edge of the exit opening in the example. The measurement beam path then is completely defined, particularly in combination with the position of the measurement beam exit. |
| Element on the housing of the measuring head or an element fixedly connected to the measuring head. These are, for example, edges or depressions in the housing. | Position of the measurement beam exit relative to the element. |
| Element on the housing of the measuring head or an element fixedly connected to the measuring head. These are, for example, edges or depressions in the housing. | Direction vector of the measurement beam based on the given reference element. The measurement beam path then is completely defined, particularly in combination with the position of the measurement beam exit. |
| Element on the housing of the measuring head or an element fixedly connected to the measuring head. These are, for example, edges or depressions in the housing. | Distance of the element to the measurement beam and/or an angle which the element includes with the measurement beam, in particular that the element extends parallel to the measurement beam. |
| Securable alignment element, for rotating, tilting and/or moving the measuring head. | Distance of the element to the measurement beam, in particular to the center of rotation. |

Preferably, the spatial relation between the spatial beam path of the measurement beam and the position and orientation of the relative beam position image recording unit is provided as a spatial relationship, and so no further determination of parameters is necessary. In particular, a measuring head element is preferably specified with a specified relationship to the measurement beam path, and so no more parameters need to be determined after determining the spatial relationship of the measuring head element to the position and orientation of the relative beam position image recording unit.

The scope of the invention also includes the measuring head element and a relation between the beam path and the measuring head element being specified such that at least one parameter, in particular one or two parameters, must still subsequently be determined in method step F. By way of example, this is the case if, as stated above, the measuring head element is an alignment element such as a center of rotation of the measuring head and the distance between the measurement beam and the center of rotation is specified as the relation. In this case, the spatial relationship between the center of rotation and the position and orientation of the relative beam position image recording unit is therefore known, but not the actual orientation of the measuring head at the center of rotation, which can be described, for example, by two angles. As already described, these two angles thus represent two parameters that are to be determined in method step F, unless they are determined directly by additional measurement apparatuses.

Preferably, the measuring head element is stored as a complete schematic representation of the measuring head in which the path of the measurement beam is defined. During subsequent use, the portions that are not required can be masked.

The relative beam position image recording unit element is analogously in a specified spatial relationship with the relative beam position image recording unit, and so if the position and orientation of the relative beam position image recording unit element is known, the position and spatial orientation of the relative beam position image recording unit can be determined by the specified relationship. By way of example, a relative beam position image recording unit element can be an element of the housing of a camera. In this case, the specified relationship is the spatial relationship of the relative beam position image recording unit element with the recording location of the image recording unit.

The measurement apparatus model can be specified, in particular on the basis of CAD data, FE data or other preceding steps for providing a measurement apparatus model.

Spatially resolved images are advantageously used to create the measurement apparatus model: Method step E therefore advantageously includes the following method steps:

Ei. recording a plurality of spatially resolved measurement apparatus images, which at least comprise the measuring head element and the relative beam position image recording unit element, from different perspectives;

Eii. creating a measurement apparatus model, which has at least the measuring head element and the relative beam position image recording unit element, by the plurality of spatially resolved measurement apparatus images.

The method steps Ei and Eii thus serve to provide the measurement apparatus model.

In this advantageous embodiment, this consequently yields the advantage that the data required to provide the measurement apparatus model are at least partially, preferably completely, captured by recording the spatially resolved images. In particular, in a further advantageous embodiment, the creation of the measurement apparatus model can be implemented in a manner analogous to method steps A and B: The scope of the invention here includes all spatially resolved images according to method step A and method step Ei being captured by the same image recording unit. The use of different image recording units for creating the spatially resolved images is also within the scope of the invention, in particular a first image recording unit for carrying out method step A and a second image recording unit for carrying out method step Ei. In a further advantageous embodiment, method step Ei is integrated into method step A.

The spatially resolved images for creating the measurement apparatus model are preferably recorded by an image recording unit mentioned for method step A. The three-dimensional model is preferably created by photogrammetry, particularly preferably as described in method step B.

In an advantageous embodiment, a measuring head alignment model is specified which comprises at least the measuring head element at least schematically and a relative beam position image recording unit alignment model is specified which comprises at least the relative beam position image recording unit at least schematically. Furthermore, the beam path of the measurement beam is specified at least in the measuring head alignment model.

In particular, at least
a location, which is located on the optical axis defined by the measurement beam or which is in specified fashion spatially related thereto, and/or
a direction vector specified by the measurement beam propagation direction and/or
the beam path in the alignment model on the basis of two parameters to be determined, in particular two angles of rotation of the measuring head,
is preferably specified in the measuring head alignment model.

In an advantageous embodiment, the measuring head alignment model and/or the relative beam position image recording unit alignment model, preferably both alignment models, comprise schematic models based on, for example, CAD data, FE data or other previous steps for providing a measurement apparatus model.

In a further advantageous embodiment, the measuring head alignment model comprises a schematic structure of the measuring head, in particular only a schematic structure of the measuring head. In this advantageous embodiment, the shape of the measuring head or of parts of the measuring head is therefore only specified in an abstract manner. Measuring heads often have simple geometric shapes. In particular, approximately cylindrical or cuboid measuring heads are known, or measuring heads whose shape can be approximated by a combination of a few cylinders and cuboids. In a manner particularly economical in terms of the method, an approximately geometric structure, such as a cylinder or cuboid or a combination of cylinders and cuboids, can therefore be specified as the alignment model. In contrast to the above-described method step, there also is according to this advantageous embodiment an alignment of the alignment model with a measurement apparatus model, which was created by capturing a plurality of spatially resolved images from a plurality of perspectives, in particular as described above. The relative beam position image recording unit alignment model is preferably designed analogously.

An alignment model, preferably the measuring head alignment model, preferably includes a specified relationship with the measurement beam as additional information. The specified model thus contains the measuring head element or represents the measuring head element. However, there additionally is an alignment with the aforementioned model based on the spatially resolved images from a plurality of perspectives, and so the result is a measurement apparatus model which comprises the model based on the plurality of spatially resolved images from different perspectives and the information from the measuring head alignment model, in particular with the specified relationship with the measurement beam.

The alignment of the measurement apparatus model to the measuring head alignment model and to the relative beam position image recording unit alignment model is also called "fitting" and can be carried out using method steps known per se, preferably as follows:

In this case, the procedure is divided into two sequential steps. First, the transformation (rotation and translation) which transforms the respective alignment model into the measurement apparatus model is determined. This process is generally referred to as global registration. Subsequently, the transformation is refined in such a way that the point clouds of the measurement apparatus model and the alignment model are brought into the best possible congruence. On the basis of the determined transformation, it is possible to subsequently transform all points and vectors linked to the alignment model into the measurement apparatus model, e.g. measurement beam exit point, measurement beam path or auxiliary beam exit point and path.

Global registration can be implemented, for example, by way of fast point feature histograms (FPFH) (DOI: 10.1109/ROBOT.2009.5152473). These represent points with their local properties (surrounding points, surface normal, etc.) in a multidimensional space. These FPFH are calculated both for the alignment model used and for the measurement apparatus model, and point correspondences are selected in an iterative process and the resulting transformation is calculated. As a rule, the deviations following this step are so small that the transformation can be refined in a second step without using FPFH.

For initially roughly aligned models, an iterative closest point (ICP) algorithm is often applied to improve the alignment, e.g., according to DOI: 10.1109/IM.2001.924423. From the point cloud of the measurement apparatus model, it determines the points with the smallest distance in the alignment model and adapts the transformation such that their distance is minimized (point-to-point). The selected points are filtered using a limit value. The transformation is improved over a plurality of iteration steps and more and more points are selected and brought into congruence. In addition to the point spacing, the surface normal can also be used (point-to-plane).

Conversely, the measurement apparatus model can also be transformed into the alignment model. The results are equivalent.

Alignment models can be derived from CAD models. Here, points are interpolated on the known surfaces and, where necessary, the surface normal for each point is calculated using the triangles.

Alternatively, a schematic alignment model which describes the measuring head using basic geometric objects (cuboid, cylinder, sphere, etc.) can be stored. For the basic objects, points of any density can be calculated on their surfaces and the surface normal can also be determined.

The use of a combination of CAD model and schematic alignment model is described below as an exemplary embodiment. A CAD model of the entire measuring head and one of the lens are used as a schematic model:
1. Calculation of the FPFH both for the CAD model (alignment model) and for the measurement apparatus model.
2. Global registration of both models
3. Refinement of the transformation by the ICP algorithm
4. Further refinement of the transformation by the ICP algorithm using the schematic model.

The use of a measurement apparatus model can likewise be combined with the use of position detectors: In a further advantageous embodiment, a measurement apparatus model additionally containing measurement data is provided. In this advantageous embodiment, a holding apparatus containing at least one position detector is used for the measuring head, as described above. The measuring head is arranged on the holding apparatus in such a way that the position of the measuring head can be changed relative to the holding apparatus and the position and/or the change in position is detected by the position detector, in particular as described above. In this advantageous embodiment, too, the spatial relation is consequently provided as a spatial relationship which no longer requires any further determination of parameters.

However, the determination of the beam path in method step F is also possible if a relation in which parameters still have to be determined is only specified in method step E: In an advantageous embodiment, the measurement apparatus is embodied in such a way that a relation is specified by the measurement apparatus between the position and orientation of the relative beam position image recording unit and the beam path of the measurement beam, in particular a relation which is dependent on at least one, preferably two, parameters to be determined. These parameters are preferably determined in method step F, as explained in more detail below.

In an advantageous embodiment, therefore, in method step E, the spatial relation is specified as a function of at least one, preferably at least two, parameters to be determined, particularly preferably as a function of exactly two parameters. In particular, it is advantageous that the parameter or parameters yet to be determined describe e.g.:
 a location on the optical axis of the measurement beam,
 the propagation direction of the measurement beam,
 an angle of rotation, particularly in the case where the measuring head can be adjusted about an axis of rotation,
 two angles of rotation, particularly in the case where the measuring head can be adjusted about two axes of rotation, and/or
 a travel or displacement position, particularly in the case of an adjustment option by a displacement.

A spatial relation with parameters yet to be determined is also given, for example, if position detectors are dispensed with in the previously described embodiment having these detectors or if, as a minimum, no complete spatial relationship is determinable by the detectors such that at least one parameter to be determined still remains.

Consequently, a complete determination of the spatial relationship between the measurement beam path and position and orientation of the relative beam position image recording unit requires a determination of the aforementioned parameters, for example one angle of rotation in the case of an adjustment option about one axis of rotation, two angles of rotation in the case of an adjustment option about two axes of rotation or a travel or displacement position in the case of an adjustment option by a displacement.

Consequently, the relation is specified according to method step E in the above-described advantageous embodiment of the method according to the invention; however, one or two parameters still need to be determined for the purposes of the complete provision of the spatial relationship, more particularly there is the need to ascertain the displacement position and/or tilt position of the measuring head, as chosen by the user, relative to the relative beam position image recording unit or of the measuring head relative to the holding apparatus if the spatial relationship between the relative beam position image recording unit and the holding apparatus is specified.

In method step E, a measurement apparatus model is advantageously provided, as mentioned above, which model comprises at least one measuring head element of a measuring head of the interferometric measurement apparatus, said measuring head element being in specified fashion spatially related to the measurement beam and comprising at least one relative beam position image recording unit element which is in specified fashion spatially related to the relative beam position image recording unit. The scope of the invention also includes the measurement apparatus model merely specifying a relation between the measuring head element and measurement beam and, consequently, parameters still requiring determination and, in particular, being determined in method step F according to this advantageous embodiment, even if a measurement apparatus model is used.

Advantageously, the beam path is respectively determined by the method for a plurality of measurement beams of a plurality of measurement apparatuses. Here, in method step E, the spatial relation between the position and orientation of the relative beam position image recording unit and the spatial beam path of each measurement beam is provided.

It is desirable in some measurement situations to use a plurality of measurement apparatuses, each with at least one, preferably exactly one, measurement beam. As a result, spatially different measurement points on the measurement object can be measured at the same time and/or a measurement point can be measured by measurement beams with different angles of incidence of the measurement beams on the measurement object, and so vibration information can be ascertained in a plurality of dimensions. In this case, it is sufficient to carry out the method steps A to C once. Advantageously, the same relative beam position image recording unit is used for all measurement apparatuses, and so method step D also needs to be carried out only once. In method step E, a spatial relation can be provided between each measurement apparatus and the relative beam position image recording unit. Likewise, a spatial relation to another measurement apparatus can be provided for one or more measurement apparatuses provided that a spatial relation to the relative beam position image recording unit is determinable, at least indirectly, for each measurement apparatus.

Consequently, according to the embodiment above, method step E represents the second step for creating the basis for determining the spatial beam path according to method step F:

In method step F, the spatial beam path of the measurement beam of the interferometric measurement apparatus is determined relative to the measurement object on the basis of the relation provided in method step E and the spatial position and orientation of the relative beam position image recording unit relative to the measurement object according to method step D. Consequently, the spatial beam path of the measurement beam is preferably available in a coordinate system of the measurement object model. By way of example, the spatial beam path can be specified by specifying a location on the optical axis of the measurement beam and by specifying a measurement beam propagation direction. Likewise, the spatial beam path can be implemented by specifying two spatially different points on the optical axis of the measurement beam.

In principle, it is advantageous to design the method step F such that, in method step F, the measurement beam path is determined by carrying out method step Fi and at least one of method steps Fii and Fiii:

Fi. determining the coordinates in the measurement object model of at least one location, which is located on the optical axis defined by the measurement beam or which is in specified fashion spatially related thereto;

Fii. determining the direction vector specified by the measurement beam propagation direction in the measurement object model;

Fiii. determining the coordinates of a second location in the measurement object model, which location is located on the optical axis defined by the measurement beam or which location is in specified fashion spatially related thereto and at a different location to the location used in Fi.

In particular, determining the measurement beam path by Fi and Fii is advantageous since, as described above, a location can often be determined according to Fi and the measurement beam propagation direction can often be determined according to Fii on account of the geometry or the spatial configuration, in particular by a measurement apparatus model. The scope of the invention also includes carrying out all steps Fi, Fii and Fiii. In this case, an overdetermined system may be present, which facilitates greater accuracy when determining the beam path or which can be used to ascertain the initially unknown parameters in the case where method step E only provides a spatial relation with parameters still to be ascertained, as will be explained in more detail below and in the exemplary embodiments.

In method step Fiii, it is possible to determine any desired point that is spatially different from the location according to Fi and that is located on the optical axis defined by the measurement beam or that is in specified fashion spatially related thereto.

It is particularly advantageous to use a point of incidence of the measurement beam or of an auxiliary beam on the measurement object in method step Fi or in method step Fiii:

A further advantage of the present invention is evident here: On account of the three-dimensional measurement object model created in method steps A and B, it is possible to easily assign coordinates in the measurement object model to a point on the measurement object. This is especially possible, in particular, when a spatially resolved image is recorded by the relative beam position image recording unit and the aforementioned point is defined or identified by way of the image of the relative beam position image recording unit since each location in a spatially resolved image of the relative beam position image recording unit can be assigned a location in the three-dimensional measurement object model and, in particular, can also be assigned the spatial coordinates of the latter.

In particular, it is advantageous to determine the coordinates of measurement beam points of incidence and/or auxiliary beam points of incidence using the following method steps:

F.a ascertaining an assignment rule between the individual positions on a spatially resolved image of the relative beam position image recording unit, in particular on the relative beam position determination image, and the associated points in the three-dimensional measurement object model with the aid of at least one spatially resolved relative beam position determination image in combination with the three-dimensional measurement object model and/or the plurality of spatially resolved measurement object images;

F.b determining the point of incidence of the measurement beam and/or of the auxiliary beam on the measurement surface on the basis of the spatially resolved image of the relative beam position image recording unit and the assignment rule according to F.a.

To identify/localize the beam point of incidence in a spatially resolved image, preferably from the relative beam position image recording unit, it is advantageous to temporarily darken the image (in particular by closing a shutter of a camera of the image recording unit and/or by shortening the exposure time) such that it is preferably substantially only the measurement beam and/or auxiliary beam that is captured by the camera and, in particular, overexposure of the camera image by the measurement beam and/or auxiliary beam is avoided. The picture element coordinates of the measurement beam and/or auxiliary beam are preferably determined by suitable averaging of picture element coordinates with brightness levels above a certain threshold.

This method is preferably also used in order, when using a plurality of beam points of incidence of measurement and/or auxiliary beams, to determine the spatial coordinates of the points of incidence in the measurement object model. In this case, it may be advantageous to irradiate only one point sequentially in each case in order to achieve a unique assignment between the point of incidence and the associated beam or associated beam source. The scope of the invention also includes other assignment methods, such as modulation of the beams, a differentiation of the beams in terms of color, size and/or shape of the point of incidence or other distinguishing features that are determinable by an image recording unit.

Since, as described, the associated 3D coordinates in the three-dimensional measurement object model can now be assigned to each location in images recorded with the aid of the relative beam position determination unit, it is naturally also possible immediately for each beam point of incidence that can be identified in an image of the relative beam position determination unit, in particular each measurement beam point of incidence, to assign the associated 3D coordinates in the three-dimensional measurement object model thereto.

Should the spatial relation, specified in method step E, between the spatial beam path of the measurement beam of the interferometric measurement apparatus and the position and orientation of the relative beam position image recording unit even be a spatial relationship, then it is possible to describe the beam path of the measurement beam in the same coordinate system as the relative beam position image recording unit. Since the spatial position and orientation of the relative beam position image recording unit relative to the measurement object is known, in turn, from method step D, it is then also immediately possible to easily determine the spatial beam path of the measurement beam of the interferometric measurement apparatus relative to the measurement object. This is implemented by method steps Fi and Fii or Fi and Fiii, depending on whether the spatial beam path was specified by a point on the measurement beam and a direction vector or by two points on the measurement beam in method step E.

Additionally, the position or the coordinates of the measurement beam point of incidence on the measurement object can also be determined in this situation, preferably by method steps F.a and F.b. This provides a further point on the measurement beam in the measurement object coordinate system. Since this point is particularly relevant to the evaluation of the interferometric measurements, in particular for vibration measurements, and the described direct determination of the coordinates thereof is very precise, this point is particularly suitable for determining the spatial beam path of the measurement beam of the interferometric measurement apparatus. It is preferably used as one of the two locations in method steps Fi and Fiii and can alternatively be combined with a second point of method step Fi or Fiii or with a direction vector according to method step Fii in order to determine the spatial beam path of the measurement beam relative to the measurement object.

However, it is also possible to combine this point with further points or the direction vector already determined in method steps Fi and Fiii or Fi and Fii in order thereby to obtain an actually overdetermined, in which a higher accuracy can be achieved by way of suitable optimal fitting methods when determining the beam path.

If a spatial relation which initially still contains unknown parameters was specified in method step E, it may be possible, in general, to separately determine one or more of said parameters by way of suitable methods and use these to make the spatial relation provided in method step E more precise and possibly even convert the latter directly into a spatial relationship, which is then used in method step F as explained above to specify the beam path relative to the measurement object. By way of example, as described in relation to method step E, such parameters can be determined by suitable measurement apparatuses or they are known because these parameters are set on the basis of a calibrated control unit.

However, the situation may arise where, even after this step, the spatial relation between the spatial beam path of the measurement beam and the position and orientation of the relative beam position image recording unit still contains unknown parameters, which cannot be determined by the above-described simple measures.

In this case, the method according to the invention itself can now be used to determine the remaining unknown parameters:

According to method step E, a spatial relation is available between the spatial beam path of the measurement beam and the position and orientation of the relative beam position image recording unit; although this is not a spatial relationship, it could be converted into the latter if the unknown parameters are known.

For all possible values which these unknown parameters could adopt in principle, there now actually is an associated unique spatial relationship between the path of the measurement beam and the position and orientation of the relative beam position image recording unit in each case and hence, according to method step D, also an associated path of the measurement beam relative to the measurement object. However, this then only corresponds to the actual path if the unknown parameters are chosen correctly; in particular, the point of incidence of the measurement beam on the measurement object calculated with the aid of these parameters then only corresponds to the actual point of incidence when these parameters are chosen correctly. This fact can now be used to determine the remaining unknown parameters. To this end, the actual position or the actual coordinates of the measurement beam point of incidence on the measurement object is/are determined, preferably by method steps F.a and F.b. From this, it is then possible to determine those values for the unknown parameters for which the calculated point of incidence corresponds to the actual measured point of incidence, said values then corresponding to the actual values of the previously unknown parameters. These actual parameter values can then be used to convert the spatial relation between the beam path of the measurement beam and the position and orientation of the relative beam position image recording unit into a spatial relationship in this situation as well. As a result, it is possible, as described above, to determine the spatial beam path of the measurement beam relative to the measurement object from the now available spatial relationship and from the spatial position and orientation of the relative beam position image recording unit relative to the measurement object known from method step D.

What should be noted here is that the unambiguous determination of the unknown parameters with the aid of this procedure preferably works well if the actually measured measurement beam point of incidence on the object also includes only a single realistic parameter set which yields the same point of incidence by calculation. Since the measurement beam points of incidence typically span a two-dimensional space, mapped by the two dimensions of the images of the relative beam position image recording unit, this situation is present, as a rule, if the unknown parameters are one or two linearly independent parameters, for example independent angles, independent linear displacements or independent combinations thereof. However, situations in which even more than two unknown parameters can be determined using the procedure described are by all means conceivable, specifically, even in the case of this plurality of parameters, if there likewise is only a single realistic parameter set which yields the same point of incidence by calculation for each actually measured measurement beam point of incidence on the object. By way of example, this may be the case when there are a plurality of latching coarse adjusters and a plurality of continuous fine adjusters so that only a single combination of coarse and fine adjuster positions is possible to reach each measurement point. Many other situations in which the procedure described is suitable for determining more than two unknown parameters are also conceivable.

When actually determining those parameters for which the associated calculated point of incidence corresponds to the actually measured point of incidence, the corresponding mathematical problem that must be solved is that of determining a number of parameters, preferably one or two, in such a way that a function that is only dependent on these parameters reaches a certain target value. There are for this purpose a large number of relevant, well-known mathematical methods, preferably numerical methods, which can all be used in principle. In a specific case, it has proven particularly advantageous to use, for example, the square of the distance between the actually measured point of incidence and the calculated point of incidence associated with the specified parameters as an evaluation criterion for the quality of the parameter values and to optimize the parameter values so that the square of the distance is as small as possible, ideally zero. By way of example, a gradient method or any other minimization method can be used to this end.

In any case, the results obtained are the actual values for the sought-after parameters, with which, as described above, the spatial beam path of the measurement beam relative to the measurement object can be determined.

By the method according to the invention, an interferometric measurement is preferably carried out on the measurement object, in particular a measurement to ascertain vibration data, and the interferometric measurement is evaluated taking into account the measurement beam path.

As described above, the measurement apparatus according to the invention is preferably embodied as a vibrometer for carrying out a vibration measurement by the measurement beam.

The measurement beam is directed at a measurement point on the measurement object, and the measurement beam reflected and/or scattered by the measurement object passes along the beam path of the measurement apparatus again in order to be superimposed with the reference beam to form optical interference. To the end, the measurement apparatus preferably comprises at least one detector in order to detect the interference signal. The desired measurement data, in particular vibration data and/or a speed of the movement of the surface of the object at the measurement point, can be determined from the interference signal. The aforementioned evaluation unit is preferably used to this end. The basic structure of the measurement apparatus can be embodied, in a manner known per se, like an interferometer, in particular a vibrometer as described above, preferably a heterodyne vibrometer.

The use of a measurement beam which cannot be detected, or which can only be detected with insufficient accuracy, by conventional image recording units is desirable for some applications of interferometric measurements. In particular, vibrometers which use laser beams in the infrared range, in particular at a wavelength of 1550 nm, are known. A disadvantage here is that the user has no or only inadequate visual control over the respective applied measurement point and an automated finding of a point of incidence is only possible with additional technical effort. Therefore, an additional auxiliary beam from an auxiliary beam source is used in an advantageous embodiment of the method according to the invention. It is coupled into the beam path of the measurement beam in such a way that the auxiliary beam is incident at the same location of the measurement object as the measurement beam.

The scope of the invention also includes the use of one or more auxiliary beams whose beam path is in specified fashion spatially related to the measurement beam and whose beam path is not identical to the beam path of the measurement beam, at least in the region of the measurement object.

In principle, the scope of the invention includes the use of points of incidence from one or more measurement beams and/or points of incidence from one or more auxiliary beams when using points of incidence on the measurement surface:

Thus, the scope of the invention includes the use of an auxiliary beam from an auxiliary beam source, the beam path of said auxiliary beam being coaxial with the measurement beam, at least in the region of the measurement object, so that the auxiliary beam is incident at the same location on the measurement surface as the measurement beam. It is true that in a multiplicity of interferometric measurements, a laser beam is used with a wavelength in the visible range, which can be captured in an uncomplicated manner using typical image recording units. However, the scope of the invention also includes the use of an auxiliary beam generated by an additional auxiliary beam source for the purposes of determining the beam path:

In the above-described advantageous embodiments, in which one or more auxiliary beams are used, it is likewise advantageous to use laser beams generated by one or more laser sources as auxiliary beams.

Likewise, the scope of the invention includes the use of other beam sources for generating auxiliary beams, in particular also light beams from LEDs or other light sources that are designed, for example, as position lasers, line lasers, crosshair lasers, line projectors, crosshair projectors or other pattern generators with an imaging unit, etc.

The measurement surface can be a partial area of the surface of a measurement article. Likewise, the spatially resolved images can additionally include the region surrounding the object to be measured, for example an installation area for the measurement article and/or a background area. The measurement object can thus also comprise one or more measurement articles and one or more areas, in particular installation areas or background areas. The measurement surface can thus also include areas that are not the surface of a measurement article.

The scope of the invention includes one or more measurement points being arranged on an area that is not the surface of a measurement article, for example on a background or installation area. Preferably, the measurement surface comprises at least the region of the measurement article or articles, in which measurement points should be arranged during a subsequent interferometric measurement.

The coordinate system of the measurement object model and any further models, in particular of a measurement apparatus model, can be selected in a manner that is customary per se. In particular, the use of a Cartesian coordinate system is advantageous, but the use of other coordinate systems also lies within the scope of the invention, for example cylindrical coordinates or spherical coordinates.

The measurement object model and/or the measurement apparatus model can be embodied for capturing the shape of three-dimensional objects, in the type known per se from photogrammetry. In particular, the scope of the invention includes the creation in method step B of a three-dimensional model which has a point cloud, preferably a polygon mesh, in particular an irregular triangular mesh. As described above, the three-dimensional model further preferably comprises texture information items of the object, in particular one or more spatially resolved images of the appearance of the measurement surface and further preferably also the associated picture element coordinates in the spatially resolved images of the measurement surface (so-called texture coordinates) for each point on the surface with 3D coordinates.

The three-dimensional model therefore preferably comprises a list of points on the surface of the object, each with 3D coordinates and texture coordinates, and a list of triangles which approximate the surface of the measurement object, in which the vertices are constituents of the list of points and the texture information of the surface is represented by the triangles, preferably by projection onto the triangles.

In the context of this application, "specified" or "provided" in relation to data means that the corresponding information is available and can be used; by way of example, it is stored on a data memory and can be read out using a corresponding reader for further processing of the information. Likewise, specified information can follow from further described method steps and can be specified as a result of these method steps, in particular by way of preferred embodiments of the method according to the invention which contain such method steps.

The scope of the invention includes the method steps described above being carried out in a different order and/or method steps being combined and/or one method step being integrated into another method step.

BRIEF DESCRIPTION OF THE DRAWINGS

Further preferred features and advantageous embodiments are described below with reference to exemplary embodiments and figures. In the drawings:

FIG. 6 shows a view of the measurement object and a spatially resolved image for explaining the determination of the position and orientation of an image recording unit; and FIG. 7 shows views of the measurement object and a spatially resolved image for explaining the determination of the 3D coordinates for a picture element of the spatially resolved image.

DETAILED DESCRIPTION

The figures show schematic representations that are not true to scale. In the figures, the same reference signs denote elements that are the same or have the same effect.

Figure 1:
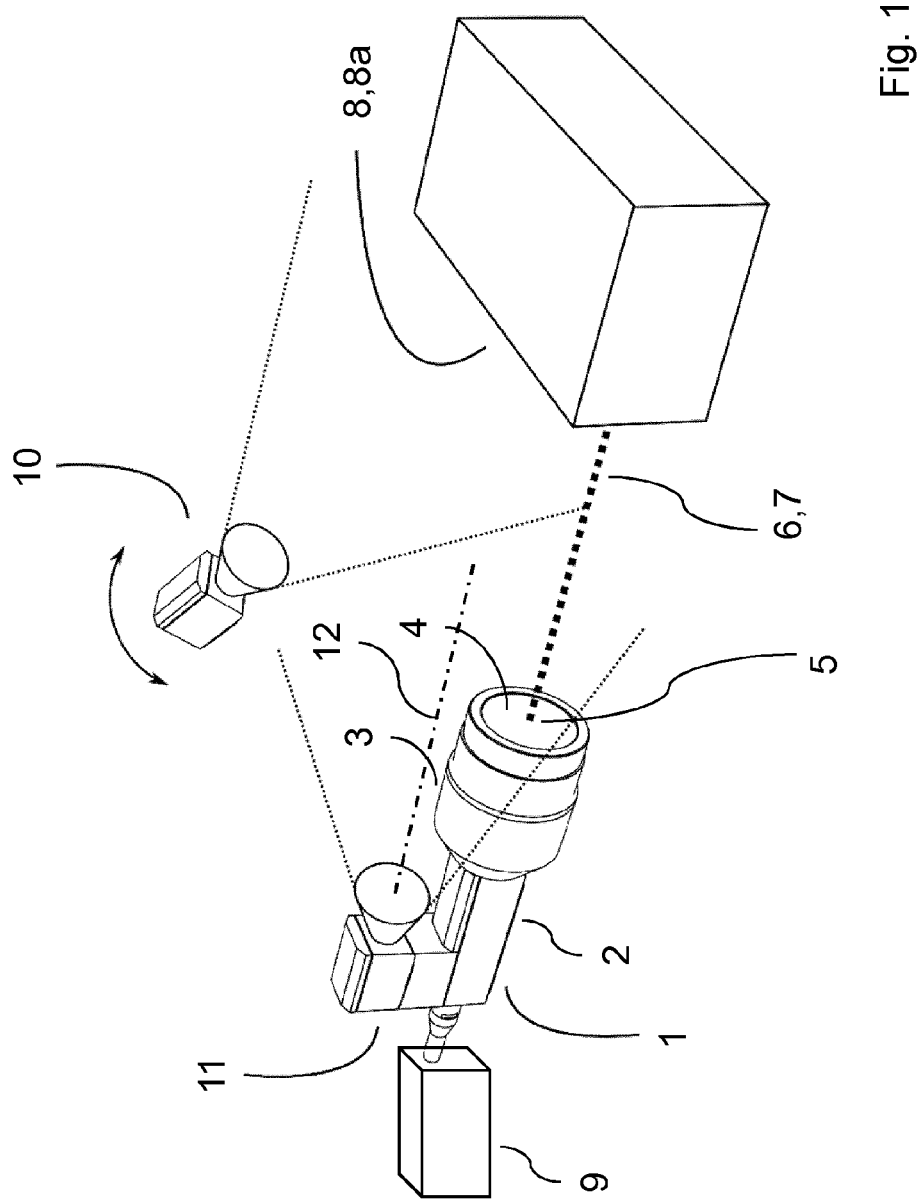
FIG. 1 shows a first exemplary embodiment of a measurement apparatus according to the invention with one measuring head.

FIG. 1 illustrates a first exemplary embodiment of a measurement apparatus according to the invention for interferometric measurement of a measurement object. The measurement apparatus comprises a measuring head 1, which is embodied as a vibrometer. The vibrometer comprises a housing with an approximately cuboid back region and an approximately cylindrical front region (2, 3).

Components of the vibrometer are arranged within the housing: In the present case, the vibrometer comprises a beam source embodied as a laser for generating a laser beam as a measurement beam. The measurement beam emerges from the measuring head 1 at a laser exit point 5 in a laser beam exit opening 4. Consequently, the measurement beam 6 has the measurement beam propagation direction 7 shown using dashed lines.

The measurement beam propagation direction 7 lies on the optical axis of the approximately cylindrical front part 3 of the measuring head.

The measurement beam 6 impinges on a measurement point on the measurement surface of a measurement article 8a of the measurement object 8. The partially reflected and/or scattered measurement beam re-enters the measuring head 1 via the laser beam exit opening 4. The measuring head 1 embodied as a vibrometer is embodied as an interferometric measurement apparatus and comprises an interferometric structure in the present case such that the laser beam generated by the laser is divided into the aforementioned measurement beam and a reference beam. The measuring head furthermore comprises a detector and is embodied such that the aforementioned reflected and/or scattered measurement beam is superimposed with the reference beam on the detector in order to form optical interference. At the back end of the cylindrical part 2 of the measuring head, the measurement signals of the detector are guided to an evaluation unit 9 via a signal line. The evaluation unit 9 comprises a computer which is embodied in a manner known per se, comprising a processor and a memory unit, in order to determine vibration data from the measurement data of the detector.

The measurement apparatus according to FIG. 1 is used to carry out a vibration measurement on a measurement object 8. The measurement object 8 comprises a measurement article 8a shown schematically as a cuboid.

The measuring head 1 is connected to an evaluation unit 9 in order to evaluate the measurement signals of the detector, arranged in the measuring head 1, of the measurement apparatus for interferometric measurement for determining vibration data of the measurement article 8a at the location of the point of incidence of the measurement beam 6 and determine the vibration amplitudes and phases of the vibration to be examined.

The evaluation unit 9 is also embodied to determine the beam path of the measurement beam 6, as described below using a first exemplary embodiment of a method according to the invention.

The measurement apparatus furthermore comprises a first, movable image recording unit 10 and a relative beam position image recording unit 11. Both image recording units are embodied to record spatially resolved images; in particular, they can comprise CCD or CMOS cameras. The first image recording unit 10 is movable relative to the measurement object 8 and the measuring head 1. The relative beam position image recording unit 11 is fixedly arranged relative to the measuring head 1.

In a first exemplary embodiment of the method according to the invention, a plurality of spatially resolved images of the measurement article 8a are recorded in a method step A by the first image recording unit 10. To this end, a user moves the movable first image recording unit 10 around the measurement article 8a, while a multiplicity of spatially resolved images are recorded automatically.

The first image recording unit 10 is embodied to carry out a stripe projection and therefore has a camera for capturing spatially resolved images and a projection unit for projecting stripe patterns. The first image recording unit 10 is connected to the evaluation unit 9 by a cable or, alternatively, in wireless fashion. The evaluation unit 9 thus also carries out the storage and processing of the data of the first image recording unit 10 and of the relative beam position image recording unit 11.

As described above, the first image recording unit 10 generates stripe patterns according to the principle of stripe projection during the recording of the plurality of spatially resolved images such that, in a manner known per se, a three-dimensional model is created photogrammetrically by the evaluation unit 9 in a method step B, said model at least comprising the surface of the measurement article 8a facing the measuring head 1. The three-dimensional model has a polygon mesh of triangles, which reproduces the geometric shape of this region. Alternatively, the first image recording unit 10 is embodied as a commercially available camera or a combination of an illumination unit and one or more cameras. Both black-and-white and color cameras can be used. Particularly preferably, in addition to the information required to determine the geometry of the measurement surface, the image recording unit also records information items relating to the texture and/or color of the surface, particularly preferably by comprising a color camera, for example. The recording of texture and/or color information items and their spatial association with the recorded images or the topographical 3D model of the object is particularly advantageous because, as described above, this allows the different recorded images to be associated with one another much better and the location of the recording of the respective camera image can also be assigned much more precisely relative to the 3D model.

As described above, the relative beam position image recording unit 11 is arranged, and hence provided, on the measuring head 1. A spatially resolved relative beam position determination image of the measurement surface of the measurement object 8 is recorded in a method step C by the relative beam position image recording unit 11.

In a method step D, the spatial position and orientation of the relative beam position image recording unit 11 is determined relative to the measurement object 8 with the aid of the relative beam position determination image recorded in method step C in combination with the three-dimensional measurement object model.

To this end, projected views of a geometric model of the measurement object model are compared to the relative beam position determination image. By adapting and using identified features and the texture of the measurement object model, the position and orientation of the relative beam position image recording unit 11 is determined in such a way that the projected view corresponds to the relative beam position determination image or at least has the best correspondence of the projected views.

As a result, the position and orientation of the relative beam position image recording unit 11 is thus known in the coordinate system of the measurement object model, a Cartesian x-, y-, z-coordinate system in the present case.

In a method step E, a spatial relation is provided between the spatial beam path of the measurement beam 6 and the position and orientation of the relative beam position image recording unit 11. In the present case, the relative beam position image recording unit 11 has an optical axis 12, which is specified by the captured image region. The spatial relation according to the first exemplary embodiment now specifies that the measurement beam path of the measurement beam 6 is located parallel to the aforementioned optical axis of the relative beam position image recording unit 11 and, moreover, the spatial relation of the two optical axes to one another; i.e., the distance is specified, and also the direction in which the optical axis of the measurement beam 6 is spaced apart from the optical axis of the relative beam position image recording unit 11.

In the present exemplary embodiment, the spatial relation consequently represents a spatial relationship, in which no further parameters need to be determined.

What is firstly known from method steps B and E in a first step is the location and the orientation of the relative beam position image recording unit 11 in the coordinate system of the measurement object model. Furthermore, the spatial relationship between the optical axis of the relative beam position image recording unit 11 and the optical axis of the measurement beam 6 is specified in a second step. Consequently, in a method step F, the spatial beam path of the measurement beam 6 of the interferometric measurement apparatus can easily be determined relative to the measurement object 8 in the coordinate system of the measurement object model on the basis of the relation provided in method step E and the spatial position and orientation of the relative beam position image recording unit relative to the measurement object.

Figure 2:
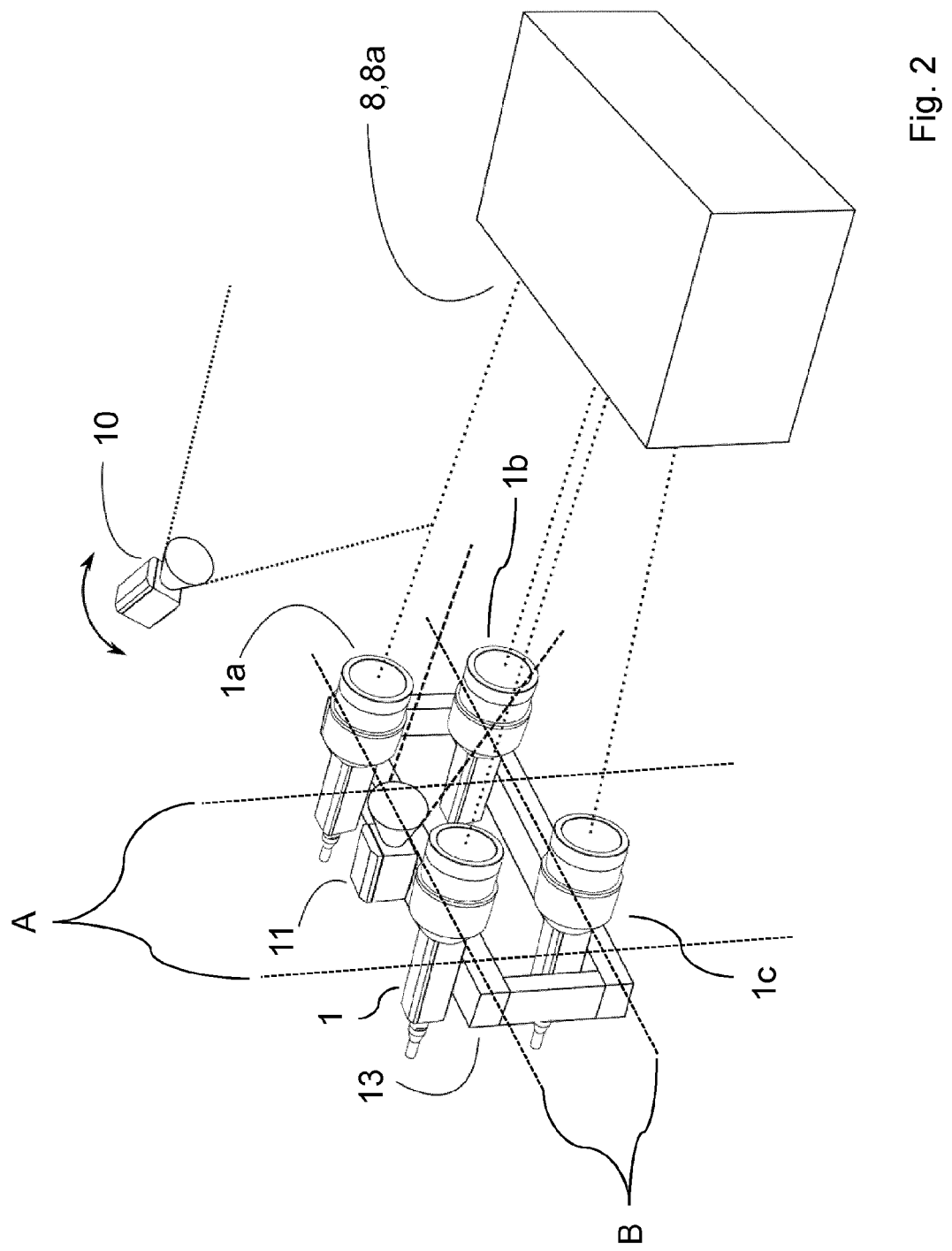
FIG. 2 shows a second exemplary embodiment of a measurement apparatus according to the invention with four measuring heads.

FIG. 2 illustrates a second exemplary embodiment of a measurement apparatus according to the invention, which comprises a plurality of measuring heads. To avoid repetition, only the essential differences in comparison with FIG. 1 will be discussed.

The measurement apparatus according to the second exemplary embodiment comprises a holding apparatus 13, on which four measuring heads 1, 1a, 1b and 1c are arranged. The measuring heads each contain the vibrometer, but particularly the laser beam exit opening and an optical unit for receiving the back-scattered light. They are all connected to a common evaluation unit (not illustrated) according to the evaluation unit 9 of FIG. 1.

The relative beam position image recording unit 11 of the measurement apparatus is likewise arranged on the holding apparatus 13.

In a first variant of the second exemplary embodiment of the measurement apparatus according to the invention, the four measuring heads are fixedly attached to the holding apparatus 13, and the exact beam path of the respective measurement beams relative to the relative beam position image recording unit is known, for example on account of manufacturing specifications.

In a second exemplary embodiment of the method according to the invention, the beam path of each measurement beam of the measuring heads 1, 1a, 1b and 1c is determined as described in relation to FIG. 1 and the first exemplary embodiment of the method according to the invention. However, steps A, B, C and D only have to be carried out once in this case.

In a method step E, a spatial relation, configured as a spatial relationship in the present case, is provided for each measuring head such that the spatial beam path of the respective measurement beam can be determined directly for each measuring head.

In a second variant of the second exemplary embodiment of the measurement apparatus according to the invention, the measuring heads of the measurement apparatus according to FIG. 2 can be directed at spatially different measurement points on the measurement article 8a in order to carry out a simultaneous measurement of various measurement points. Likewise, the measurement beams can be directed at an identical measurement point on the measurement article 8a in order to measure a vibration in a plurality of spatial directions.

By way of example, the measuring heads are each manually pivotable by the user about a first axis A and about a second axis B perpendicular thereto. Consequently, the user can select the measurement point of each measuring head on the measurement article 8a by pivoting the respective measuring head and can subsequently lock the measuring head.

In a first sub-variant of this exemplary embodiment variant, two angle detectors are attached to each measuring head in order to measure, for each measuring head, an angle position in respect of an axis A and an angle position in respect of an axis B. All eight angle detectors are likewise connected to the evaluation unit 9. The evaluation unit 9 is embodied to calculate the corresponding angles from the measurement signals of the angle detectors. Consequently, by the evaluation unit and by using the angles calculated from the angle detector measurement data for each measuring head, it is possible to convert the spatial relation respectively specified for said measuring head into a spatial relationship between the beam path of the measurement beam 6 and the position and orientation of the relative beam position image recording unit 11, and no further parameters need to be determined in or for method step F.

Consequently, in method step F, the spatial beam path of the measurement beam 6 of the interferometric measurement apparatus can easily be determined again relative to the measurement object 8 in the coordinate system of the measurement object on the basis of the relation provided in method step E and the spatial position and orientation of the relative beam position image recording unit relative to the measurement object.

A third exemplary embodiment of the method according to the invention now proceeds from a second sub-variant of the preceding exemplary embodiment variant of the measurement apparatus according to the invention according to FIG. 2, which has adjustment options for the individual measuring heads, just like in the first sub-variant of this exemplary embodiment variant, but there now are no direct measurement options for determining the orientation of the pivoted measuring heads.

In this case, it is only possible to provide a spatial relation between the spatial beam path of the respective measurement beam and the position and orientation of the relative beam position image recording unit in method step E for each measuring head and, unlike in the preceding sub-variant, it is initially not possible to provide a spatial relationship. In the present case, this means that the relation is specified in each case as a function that is dependent on two angles. If these two angles which describe the angular positions of the respective measuring head in respect of axis A and in respect of axis B are known, it is again possible to convert the specified relation into a spatial relationship such that it is possible again to proceed as previously using said spatial relationship. However, in the present exemplary embodiment, deviating from the preceding exemplary embodiment, there now are no direct measurement options for determining the exact orientation of the pivoted measuring heads. Nevertheless, it is possible to specify the spatial beam path of the measurement beams relative to the measurement object with the aid of the method according to the invention:

To this end, it is initially necessary to convert, for each measuring head, the known spatial relation between the respective measurement beam and the relative beam position image recording unit into a spatial relationship by virtue of the two initially unknown parameters, specifically the two pivot angles of the respective measurement beam, being ascertained in each case.

Now, using the known spatial relation and the spatial position and orientation of the relative beam position image recording unit 11 relative to the measurement object 8 determined in method step D, it is possible for, in principle, all adjustable pivot angles of the respective measuring head to calculate the spatial beam path of the associated measurement beam relative to the measurement object. Likewise, it is then also possible to determine the corresponding point of incidence of the respective measurement beam on the measurement object. Since the two pivot angles are spatially independent of one another in each case, each measuring head also has a different point of incidence on the measurement object belonging to each different pair of possible pivot angles. Now, by determining the coordinates of the actual point of incidence of the respective measurement beam on the measurement object, this can easily be used to conversely determine the associated pivot angles:

To this end, the spatial coordinates of the point of incidence of the respective measurement beam on the measurement object 8 are initially determined in the measurement object model: To this end, as described above, a spatially resolved image of the measurement article 8a is recorded by the relative beam position image recording unit 11 while the measurement beam is incident on the desired measurement point. As described above, the spatial coordinates of the point of incidence of the measurement beam 6 on the measurement article 8a in the measurement object model can be determined on the basis of this spatially resolved image and from the spatial position and orientation of the relative beam position image recording unit 11 in the coordinate system of the measurement object model determined in method step D. Where necessary, the individual measurement beams are successively activated and deactivated to this end such that there can be a very simple assignment of the measurement beam points of incidence to the associated measuring heads by a plurality of recordings of the relative beam position image recording unit.

Now, all that needs to still be determined are the pivot angles of the measurement beam at which the associated calculated point of incidence corresponds to the actually measured point of incidence. There are a large number of relevant known methods for the corresponding mathematical problem of determining two parameters in such a way that a function dependent only on these two parameters obtains a certain target value. In the specific case, it was found to be particularly advantageous to use, e.g., the square of the distance between the actually measured point of incidence and the calculated point of incidence belonging to two specified pivot angles as an evaluation criterion for the quality of precisely these two pivot angle values and to optimize the pivot angle values in such a way that the square of the distance becomes as small as possible, ideally zero. To this end, a gradient method is used in the present case.

The results obtained are the actual pivot angles of all measurement beams, with which, as described above, the spatial beam path of the measurement beams relative to the measurement object is determined.

In a fourth exemplary embodiment of the method according to the invention, the spatial relation according to method step E is provided by the use of a measurement apparatus model such that there is likewise no need to resort to measurement data from angle detectors, and so a measurement apparatus which applies this exemplary embodiment of the method according to the invention does not require any detectors for detecting the location or pivot position of the measuring heads either:

In the fourth exemplary embodiment of a method according to the invention, a measurement apparatus model is provided in method step E.

Figure 3:
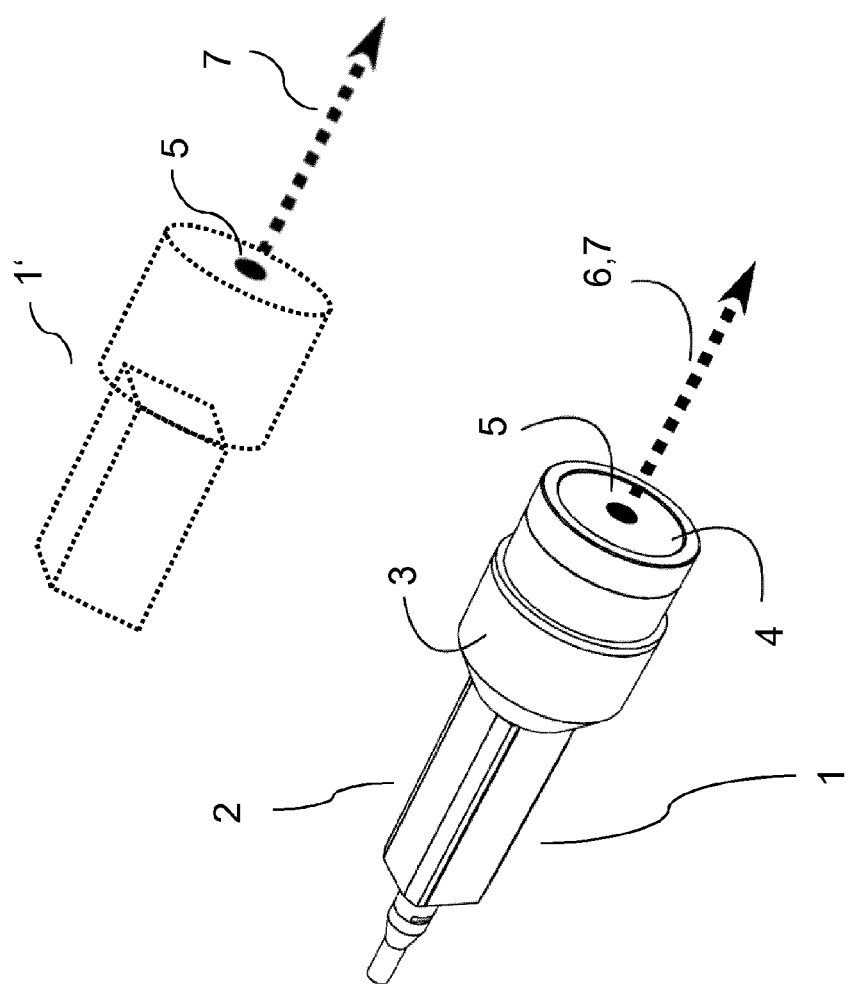
FIG. 3 shows the measuring head of the first exemplary embodiment with a measuring head alignment model.

Furthermore, an alignment model of the measuring head is specified, as explained in more detail in relation to FIG. 3:

FIG. 3 illustrates the measuring head 1 again, the housing of which has a cuboid part 2 and a cylindrical part 3.

On a front side of the measuring head there is a laser beam exit opening 4 with a laser exit point 5, at which the measurement beam 6 leaves the measuring head 1 in a measurement beam propagation direction 7. The laser beam exit opening 4 is embodied as an annulus. The laser exit point 5 is located centrally in the laser beam exit opening 4.

Shown above the measuring head 1 in FIG. 3 is the alignment model 1' for this measuring head. This alignment model 1' is embodied as a line model and comprises a cuboid and a cylinder according to the lines illustrated in dashed fashion, said cuboid and cylinder approximately corresponding to the cuboid part 2 and the cylindrical part 3 of the measuring head 1.

The alignment model 1' consequently comprises the line model illustrated in dashed fashion and the information that the laser exit point 5 is arranged centrally at the front side of the cylinder. In a further exemplary embodiment, the measurement beam propagation direction 7 is alternatively or additionally specified in the alignment model 1'.

Within the scope of method step E of this fourth exemplary embodiment, there is, in a method step Ei, a recording of a plurality of spatially resolved measurement apparatus images, which in the present case comprise the measuring heads 1, 1a, 1b and 1c, the relative beam position image recording unit 11 and the holding apparatus 13 overall. The measurement apparatus images are recorded from different perspectives. A measurement apparatus model is created in a method step Eii by the plurality of spatially resolved measurement apparatus images. The measurement apparatus images are recorded by the first image recording unit 10. In a manner analogous to method step B, the measurement apparatus model is created photogrammetrically.

Consequently, a measurement apparatus model is present, by which the alignment model 1' can be aligned: By "fitting" the alignment model 1' to the measurement apparatus model, i.e., carrying out the alignment as described above, the position of the laser exit point 5, at which the respective measurement beam leaves the measuring head, is respectively determined for each measuring head.

Furthermore, an alignment model 1' (not illustrated) is specified for the relative beam position image recording unit 11, and so the position and orientation of the relative beam position image recording unit in the measurement apparatus model is also determined in the same way.

Consequently, information items about the position and orientation of the relative beam position image recording unit 11 and about the laser exit point 5 of each measuring head are available in the coordinate system of the measurement apparatus model.

As explained in the above-described exemplary embodiments of the method according to the invention, method step D with determination of the spatial position and orientation of the relative beam position image recording unit in the coordinate system of the measurement object model is also implemented in the fourth exemplary embodiment.

Consequently, the position and orientation of the relative beam position image recording unit 11 is known in the coordinate system of the measurement object model in this stage of the method. Furthermore, the position of each laser exit point 5 of the measuring heads is known in the coordinate system of the measurement apparatus model. Consequently, the position of each laser exit point 5 can likewise be calculated in the coordinate system of the measurement object model by way of a simple coordinate transformation.

Consequently, a location on the measurement beam in the coordinate system of the measurement object model, specifically the respective laser exit point, is available for each measurement beam in this stage of the method.

Consequently, a method step Fi as described above is carried out.

Furthermore, a method step Fiii is carried out, with the coordinates of a point of incidence of a measurement beam being determined in each case: Initially, only one measuring head 1 is activated, and so only the measurement beam of the measuring head 1 is incident on the measurement article 8a. Subsequently, a spatially resolved image is recorded by the relative beam position image recording unit 11 and, as described above, the spatial coordinates of the point of incidence of the measurement beam of the measuring head 1 are calculated in the coordinate system of the measurement object model.

These steps are likewise carried out for the measuring heads 1a, 1b and 1c, and so in each case two locations on the measurement beam are known for each measuring head as a result: The laser exit point at the measuring head and the measurement beam point of incidence on the measurement article 8a.

In an alternative exemplary embodiment, the measuring head alignment model 1' additionally comprises the information that the measurement beam propagation direction is parallel to the cylinder axis of the cylindrical part of the measuring head alignment model 1'. Consequently, the measurement beam propagation direction of the measurement object model can be calculated by a simple coordinate transformation and consequently method step Fii can be carried out, and so there is no need to carry out method step Fiii.

The spatial beam path is determined for each measurement beam on the basis of the two aforementioned locations.

Alternatively, all measuring heads can be activated at the same time and, as described above, the spatial coordinates of the points of incidence can be determined by way of one or more spatially resolved images of the relative beam position image recording unit. Likewise, as described above, use is then made of a measurement apparatus model and, as described, the position and orientation of the measuring heads is determined by "fitting" the alignment model. From this, the direction vector of the laser is then determined for each head and the point of intersection with the measurement surface is extrapolated.

On the basis of the distance on the surface, the points of incidence determined from the spatially resolved images are assigned to the extrapolated points of incidence such that, ultimately, the laser beam points of incidence visible at the same time in the spatially resolved images of the relative beam position image recording unit can nevertheless be assigned to the respectively associated measuring head.

Then, the laser beam path is determined for each measurement beam by way of a point determined by the laser vector and the point of incidence.

Figure 4:
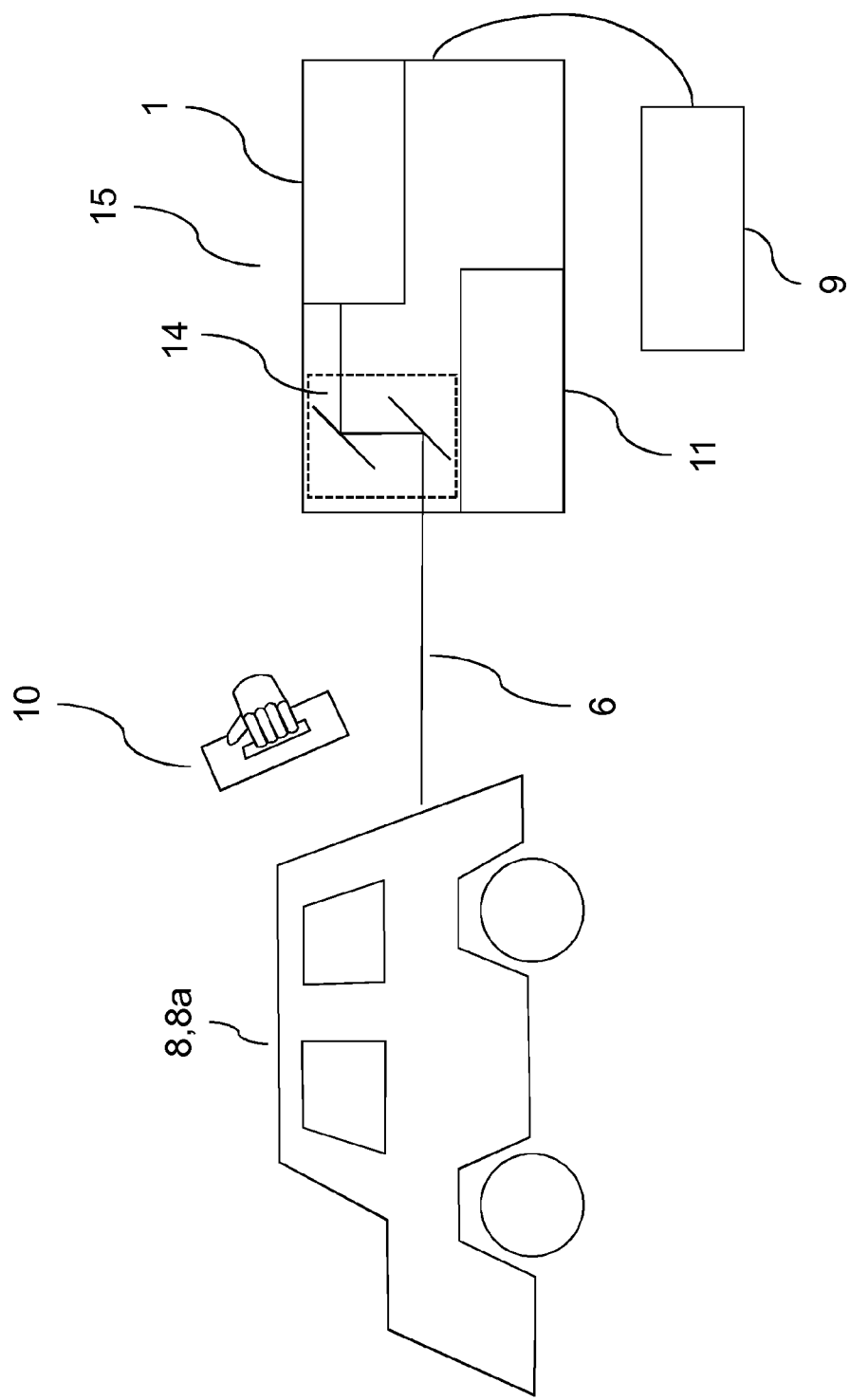
FIG. 4 shows a third exemplary embodiment of a measurement apparatus according to the invention with a beam directing unit.

FIG. 4 shows a further exemplary embodiment of a measurement apparatus according to the invention:

The measuring head 1 of this exemplary embodiment comprises a vibrometer 15 and a beam directing unit 14 embodied as a deflection unit.

In this exemplary embodiment, too, the vibrometer 1 comprises a beam splitter (not illustrated) for splitting the laser beam at the laser beam source of the vibrometer into at least one measurement beam and at least one reference beam and for superimposing on a detector for the purposes of forming optical interference the reference beam with the measurement beam reflected and/or scattered by the measurement object 8a (an automobile in the present case). In this exemplary embodiment, the laser beam has a wavelength of 632.8 nm.

The vibrometer can be embodied as described in DE 10 2012 211 549 B3.

In the present case, the beam directing unit 14 is embodied as a deflection unit and has two mirrors that are rotatable by galvanometers such that a mirror scanner is embodied for two-dimensional deflection in a manner known per se. For reasons of clarity, two mirrors of the beam directing unit 14 are shown schematically.

The measurement beam 6 of the vibrometer 15 passes through the beam directing unit 14 and is incident on a measurement surface of the measurement object 8. By the beam directing unit 14, the measurement beam 6 can be directed at a back region of the automobile and onto floor and wall areas surrounding the automobile. Consequently, the measurement object 8 comprises the automobile as the measurement article 8a and also wall and floor areas.

In the present case, the measurement surface is the area that is able to be impinged upon by the measurement beam 6 and thus comprises the surface of the automobile in a back region and also wall and floor areas.

The object of the interferometric measurement is to carry out vibration measurements for a plurality of measurement points on the surface of the automobile in the back region with the engine of the automobile running.

To this end, the measurement apparatus has an evaluation unit 9 which is connected to the vibrometer 15 and the beam directing unit 14 in the present case. Control parameters are transmitted to the beam directing unit 14 by the evaluation unit 9 in order to obtain a desired mirror position. The control unit of the beam directing unit 14 also controls the laser beam source of the vibrometer 15 and evaluates the measurement signals from the detector of the vibrometer 15 in order to ascertain vibration data from the optical interference between the measurement and reference beams. In an alternative exemplary embodiment, the evaluation unit comprises a signal processing unit and a display and memory unit. The signal processing unit calculates measurement values from the measurement signals of the detector, which measurement values are displayed on a display and stored in a memory by the display and memory unit.

Furthermore, the measurement apparatus comprises a first image recording unit 10 which, as a movable image recording unit, is embodied as described in the preceding exemplary embodiments.

Furthermore, the measuring head 1 comprises the relative beam position image recording unit 11. Relative beam position image recording unit 11, vibrometer 15 and beam directing unit 14 are arranged fixedly in relation to one another in a common housing.

In a further exemplary embodiment of the method according to the invention, method steps A to D are carried out as described in relation to the first exemplary embodiment. Consequently, a three-dimensional measurement object model is available. Furthermore, the spatial position and orientation of the relative beam position image recording unit 11 is determined relative to the measurement object 8.

The beam directing unit 14 is controlled by two parameters which describe a deflection of the beam in a first direction by the first parameter and in a second direction by the second parameter. In the simplest case of the present exemplary embodiment, these two parameters are the two deflection angles for the measurement beam that have actually been set by the galvanometer mirrors. On account of the known relative geometric position of all components in the measuring head 15, which originate either from CAD data or from manufacturing data of the measuring head, a spatial relation is given between the measurement beam of the interferometric measurement apparatus and the relative beam position image recording unit. This spatial relation becomes a spatial relationship if and only if the only two unknown parameters of the overall system, specifically the two initially unknown deflection angles of the measurement beam, are known.

In the simplest variant of the present exemplary embodiment, the mirror scanner employed is a calibrated beam directing unit, for which a unique assignment between the set control parameters for the two galvanometer mirrors and the deflection angles for the measurement beam realized thereby was determined at an earlier time by way of an adjustment or measurement. By way of this assignment, it is possible to determine the spatial beam path of the measurement beam relative to the relative beam position image recording unit on account of the known relative geometric position of the components in the measuring head 15 for all set control parameters of the beam directing unit. Since, furthermore, the spatial position and orientation of the relative beam position image recording unit 11 is known relative to the measurement object 8 from method step D, this allows the spatial beam path of the measurement beam 6 to be immediately specified relative to the measurement object, in particular the point of incidence and angle of incidence, for any set control parameter of the beam directing unit.

In a further variant of the present exemplary embodiment, the galvanometers employed for the rotation of the mirrors used for the beam deflection also comprise measurement coils in addition to their drive coils, said measurement coils allowing their actual current angle position present to be measured in each case. From the measurement values obtained, it is then possible to determine the deflection angles of the measurement beam and, following therefrom, the entire spatial beam path of the measurement beam, initially only relative to the relative beam position determination unit but then also, just like in the preceding variant of the present exemplary embodiment, relative to the measurement object, and also the point of incidence and angle of incidence.

A significant advantage of the method according to the invention is shown in a third variant of the present exemplary embodiment, in which the beam directing unit employed need not be calibrated and there need not be measurement options for determining the angles of rotation of the galvanometer mirrors. Nevertheless, it is possible with the aid of the method according to the invention to specify the spatial beam path of the measurement beam 6 relative to the measurement object for any set control parameter of the beam directing unit:

However, to do this, it is initially necessary to convert the known spatial relation between the measurement beam of the interferometric measurement apparatus and the relative beam position image recording unit into a spatial relationship by virtue of the two initially unknown parameters, specifically the two deflection angles of the measurement beam, being ascertained for the set control parameters of the beam directing unit.

Now, however, using the known spatial relation and the spatial position and orientation of the relative beam position image recording unit 11 relative to the measurement object 8 determined in method step D, it is possible for, in principle, all deflection angles of the measurement beam realizable by the two galvanometer mirrors to calculate the spatial beam path of the measurement beam relative to the measurement object. Then, the associated point of incidence of the measurement beam on the measurement object can be ascertained in the same manner for each realizable deflection angle. Since the two deflection angles are spatially independent of one another, a different point of incidence on the measurement object belongs to each different pair of deflection angles. Now, by determining the coordinates of the actual point of incidence of the measurement beam on the measurement object, this can easily be used to conversely determine the associated deflection angles:

To this end, the spatial coordinates of the point of incidence of the measurement beam on the measurement object 8 are initially determined in the measurement object model: To this end, as already described above, a spatially resolved image of the measurement article 8a is recorded by the relative beam position image recording unit 11 while the measurement beam is incident on the desired measurement point. As described above, the spatial coordinates of the point of incidence of the measurement beam 6 on the measurement article 8a in the measurement object model can be determined on the basis of this spatially resolved image and from the spatial position and orientation of the relative beam position image recording unit 11 in the coordinate system of the measurement object model determined in method step D.

Now, all that needs to still be determined are the deflection angles of the measurement beam at which the associated calculated point of incidence corresponds to the actually measured point of incidence. There are a large number of relevant known methods for the corresponding mathematical problem of determining two parameters in such a way that a function dependent only on these two parameters obtains a certain target value. In the specific case, it was found to be particularly advantageous to use, e.g., the square of the distance between the actually measured point of incidence and the calculated point of incidence belonging to two specified deflection angles as an evaluation criterion for the quality of precisely these two deflection angle values and to optimize the deflection angle values in such a way that the square of the distance becomes as small as possible, ideally zero. By way of example, a gradient method or any other minimization method can be used to this end.

In any case, the results obtained are the actual deflection angles of the measurement beam, with which, as described above, the spatial beam path of the measurement beam relative to the measurement object can be determined.

If this determination of the spatial beam path of the measurement beam relative to the measurement object, which of course has both angle of incidence and direction of incidence on the measurement object as a result, is carried out for a plurality of possible control parameters for the beam directing unit, this even allows the previously uncalibrated beam directing unit to be calibrated with the aid of the method according to the invention. To this end, the spatial beam path of the measurement beam is determined for a sufficiently tight mesh of control parameters of the beam directing unit and the results for intermediate control parameters are interpolated in a suitable way such that an assignment rule is obtained between, firstly, control parameters and, secondly, spatial beam paths, i.e., for example, points of incidence and angles of incidence on the measurement object.

Figure 5:
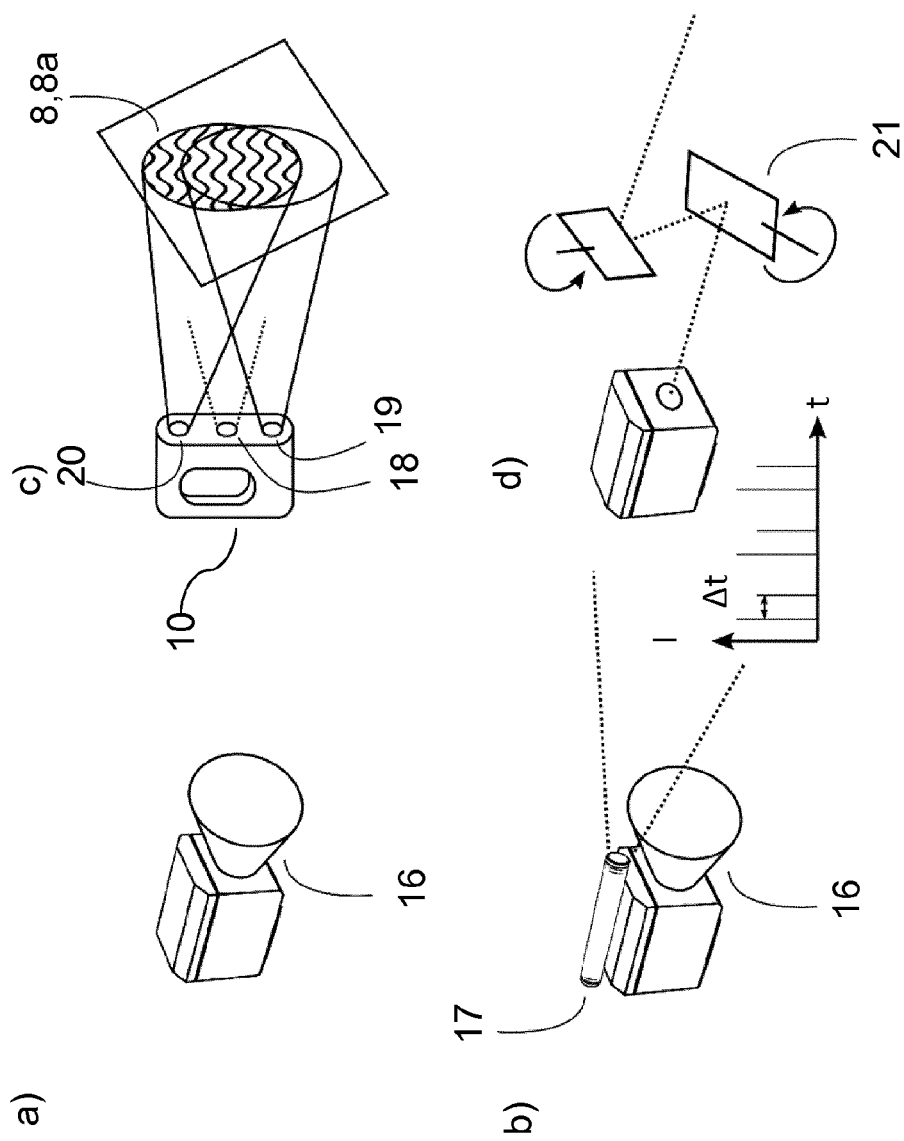
FIG. 5 shows exemplary embodiments of image recording units.

FIG. 5 schematically illustrates exemplary embodiments of image recording units of the measurement apparatus according to the invention and for use in exemplary embodiments of the method according to the invention:

The image recording unit a) is embodied as a commercially available digital camera, known per se, with a lens 16. The image recording unit according to b) additionally has a range finder 17.

In an alternative embodiment, the element provided with reference sign 17 is embodied as an illumination unit for illuminating the measurement object with pulsed and/or modulated light. An evaluation unit evaluates the time of flight (in the case of pulsed light) and/or a phase shift (in the case of modulated light) between the light emitted by the illumination unit 17 and the light received by the digital camera in order to determine the distance in a manner known per se, in particular according to the "time-of-flight" method.

As a matter of principle, these two cameras can be used both as a movable image recording unit 10 and as a stationary image recording unit 11.

The image recording unit c) is particularly suitable as a movable image recording unit 10:

The image recording unit according to c) comprises a color camera 18, a black-and-white camera 19 and a stripe projection unit 20. A stripe pattern is projected onto the measurement object 8 and, in particular, the measurement article 8a by the stripe projection unit 20. A spatially resolved image is recorded by the black-and-white camera 19. Subsequently, the stripe projection unit 20 and the black-and-white camera 19 are switched off and a spatially resolved color image is recorded by the color camera 18. This process is repeated in quick succession. The user guides the movable image recording unit 10, which is designed as a hand-held appliance, around the measurement article 4a such that a plurality of spatially resolved images are recorded both by the black-and-white camera 19 and by the color camera 18. A three-dimensional model of the measurement object 8 can be created from the images of the black-and-white camera using the stripe projection method known per se. Moreover, the individual surfaces of the three-dimensional model, in particular surfaces of a polygon mesh of the three-dimensional model, can be assigned image components of the color images recorded by the color camera 18, and so it is not only a three-dimensional model that is present but, moreover, a color image of the associated surface for each polygon.

The image recording unit d) has only one beam which can be directed at points on the surface of the measurement object by two rotatable mirrors of a deflection unit 21 of the image recording unit d). The image recording unit d) is embodied as a time-of-flight unit: In a scanning method, the measurement beam of the image recording unit d) is directed at a multiplicity of locations on the object. A light pulse is emitted for each location and the time within which the light spot reflected by the object arrives at the image recording unit d) again is measured. In a manner known per se, the distance to the object can be determined, at least qualitatively, from the time difference between the emission of the light pulse and the return of the light pulse. A three-dimensional model of the object can be created from a comparison of the times required in each case for the plurality of measurement points. The image recording unit d) is therefore suitable for carrying out method steps A and B.

In this case, too, a spatially resolved image is initially recorded by the aforementioned scanning method without moving the image recording unit d) relative to the measurement object. The image recording unit d) is subsequently moved relative to the measurement object in order to record a further spatially resolved image from a different perspective, likewise by the scanning method. By repeating these processes, a plurality of spatially resolved images are recorded from different perspectives, according to method step A.

FIG. 6 shows schematically a projected view of the measurement object 8 on the basis of the measurement object model and, above it, a stylized two-dimensional, spatially resolved image 8' of the measurement object, which was recorded with an image recording unit, preferably the relative beam position image recording unit. As already described above, projected views of the measurement object are preferably compared with the spatially resolved image in order to find the position, the direction and preferably also imaging parameters of the image recording unit. The comparison is preferably carried out using identified features of the texture of the measurement object, as is indicated schematically in FIG. 6 by a cross, circle and square on the measurement article 8a. These features can also be found in the spatially resolved image 8'. As described above, the position, direction and preferably imaging parameters of the camera are determined in such a way that the projected view matches or at least approximately matches the spatially resolved image. This determines the position and orientation of the image recording unit in the measurement object model. As a result, it is then also possible, as described above, to assign the associated 3D coordinates in the three-dimensional measurement object model to each location in images recorded with the aid of the image recording unit, in particular with the aid of the relative beam position image recording unit.

FIG. 7 schematically shows a view of the measurement object 8 with a laser beam point of incidence, labeled by a point, approximately in the center of the measurement article 8a. Above this, a spatially resolved image 8', which was recorded with an image recording unit, is illustrated schematically. The image 8' also comprises the laser beam point of incidence. As described above, by mapping coordinates of the measurement object model to the picture elements of the image 8' and by localizing the laser beam point of incidence in the image 8', the laser beam point of incidence can be assigned a position in the measurement object model, in particular three-dimensional coordinates in the coordinate system of the measurement object model, in particular by virtue of the position of the laser beam point of incidence initially being localized in the camera image and then the points of the geometry model whose projection on the camera image is very close to the laser beam point of incidence in the camera image being sought after. By interpolating the 3D coordinates of these points of the geometry model, the 3D coordinates of the laser beam point of incidence can finally be determined.

LIST OF REFERENCE SIGNS

1, 1a, 1b, 1c Measuring head
1' Measuring head alignment model
2 Cuboid part of the measuring head
3 Cylindrical part of the measuring head
4 Laser beam exit opening
5 Laser exit point
6 Measurement beam
7 Measurement beam propagation direction
8 Measurement object
8a Measurement article
9 Evaluation unit
10 First image recording unit
11 Relative beam position image recording unit
12 Optical axis of the relative beam position image recording unit
13 Holding apparatus
14 Beam directing unit
15 Vibrometer
16 Lens
17 Range finder
18 Color camera
19 Black-and-white camera
20 Stripe projection unit
21 Deflection unit

The invention claimed is:

1. A method for determining a beam path of a measurement beam of an interferometric measurement apparatus, the method comprising:
A recording a plurality of spatially resolved measurement object images of at least one measurement surface of a measurement object from different perspectives;
B creating a three-dimensional measurement object model which comprises at least the measurement surface of the measurement object using the plurality of spatially resolved images of the measurement surface;
C providing a relative beam position image recording unit and recording at least one spatially resolved relative beam position determination image of at least the measurement surface of the measurement object using the relative beam position image recording unit;
D determining a spatial position and orientation of the relative beam position image recording unit relative to the measurement object using the at least one spatially resolved relative beam position determination image in combination with at least one of the three-dimensional measurement object model or the plurality of spatially resolved measurement object images by comparing the at least one relative beam position determination image with views from different perspectives calculated using the three-dimensional measurement object model and assigning coordinates to the relative beam position image recording unit in the coordinate system of the measurement object model;
E providing a spatial relation between the spatial beam path of the measurement beam of the interferometric measurement apparatus and the position and orientation of the relative beam position image recording unit;
F determining the spatial beam path of the measurement beam of the interferometric measurement apparatus relative to the measurement object based on the spatial relation provided in method step E and the spatial position and orientation of the relative beam position image recording unit relative to the measurement object;
wherein the measurement apparatus has a beam directing unit for directing the measurement beam at a plurality of spatially different measurement points.

2. The method as claimed in claim 1, wherein, in method step F, the measurement beam path is determined by carrying out method step Fi and at least one of method steps Fii and Fiii which include:
Fi determining coordinates in the measurement object model of at least one location, which is located on an optical axis defined by the measurement beam or which is spatially related thereto in a specified manner;
Fii determining a direction vector specified by a measurement beam propagation direction in the measurement object model;
Fiii determining coordinates of a second location in the measurement object model, which second location is located on the optical axis defined by the measurement beam or which second location is spatially related thereto in a specified manner and at a different location to the location used in Fi.

3. The method as claimed in claim 2, wherein, in at least one of the method steps Fi and Fiii, coordinates of a measurement beam point of incidence of the measurement beam on the measurement object are determined in the measurement object model.

4. The method as claimed in claim 1, wherein,
in method step E, the spatial relation is specified as a fixed relative spatial position of the beam path relative to the spatial position and orientation of the relative beam position image recording unit.

5. The method as claimed in claim 1, wherein, in method step E, the spatial relation is dependent on at least one parameter to be.

6. The method as claimed in claim 5, wherein,
in method step F, determining at least one parameter to be determined is implemented by determining coordinates of at least one of the measurement beam point of incidence of the measurement beam or at least one auxiliary beam point of incidence of an auxiliary beam on the measurement object in the measurement object model, said auxiliary beam is spatially related in a specified manner to the measurement beam, based on at least one relative beam position determination image which comprises at least one of the measurement beam point of incidence or the at least one auxiliary beam point of incidence on the measurement object.

7. The method as claimed in claim 6, wherein the coordinates of at least one of the measurement beam point of incidence or the auxiliary beam point of incidence are determined using the following method steps:
F.a ascertaining an assignment rule between individual positions on a spatially resolved image of the relative beam position image recording unit and associated points in the three-dimensional measurement object model using at least one spatially resolved relative beam position determination image in combination with at least one of the three-dimensional measurement object model or the plurality of spatially resolved measurement object images;
F.b determining the point of incidence of at least one of the measurement beam or of the auxiliary beam on the measurement surface based on the spatially resolved image of the relative beam position image recording unit and the assignment rule according to F.a.

8. The method as claimed in claim 1, wherein, in method step E, a measurement apparatus model is provided, which comprises at least one measuring head element of a measuring head of the interferometric measurement apparatus, said measuring head element being spatially related to the measurement beam in a specified manner and comprising at least one relative beam position image recording unit element which is spatially related in a specified manner to the relative beam position image recording unit.

9. The method as claimed in claim 8, wherein method step E further includes the following method steps:
Ei recording a plurality of spatially resolved measurement apparatus images, which at least comprise the measuring head element and the relative beam position image recording unit element, from different perspectives;
Eii creating the measurement apparatus model by the plurality of spatially resolved measurement apparatus images.

10. The method as claimed in claim 9, further comprising specifying a measuring head alignment model, which at least comprises the measuring head element at least schematically, and a relative beam position image recording unit alignment model, which at least comprises the relative beam position image recording unit at least schematically, and specifying the beam path of the measurement beam at least in the measuring head alignment model.

11. The method as claimed in claim 1, wherein the optical axis of the measurement beam running toward the measurement object and an optical axis of the measurement beam returning from the measurement object include an angle and a profile of an angle bisector of said angle is determined as the measurement beam path.

12. A method for determining a beam path of a measurement beam of an interferometric measurement apparatus, the method comprising:
A recording a plurality of spatially resolved measurement object images of at least one measurement surface of a measurement object from different perspectives;
B creating a three-dimensional measurement object model which comprises at least the measurement surface of the measurement object using the plurality of spatially resolved images of the measurement surface;
C providing a relative beam position image recording unit and recording at least one spatially resolved relative beam position determination image of at least the measurement surface of the measurement object using the relative beam position image recording unit;
D determining a spatial position and orientation of the relative beam position image recording unit relative to the measurement object using the at least one spatially resolved relative beam position determination image in combination with at least one of the three-dimensional measurement object model or the plurality of spatially resolved measurement object images by comparing the at least one relative beam position determination image with views from different perspectives calculated using the three-dimensional measurement object model and assigning coordinates to the relative beam position image recording unit in the coordinate system of the measurement object model;
E providing a spatial relation between the spatial beam path of the measurement beam of the interferometric measurement apparatus and the position and orientation of the relative beam position image recording unit;
F determining the spatial beam path of the measurement beam of the interferometric measurement apparatus relative to the measurement object based on the spatial relation provided in method step E and the spatial position and orientation of the relative beam position image recording unit relative to the measurement object;
wherein the beam path is respectively determined by the method for a plurality of the measurement beams of a plurality of the measurement apparatuses, and
in method step E, the spatial relation between the position and orientation of the relative beam position image recording unit and the spatial beam path of each said measurement beam is provided.

13. A method for determining a beam path of a measurement beam of an interferometric measurement apparatus, the method comprising:
A recording a plurality of spatially resolved measurement object images of at least one measurement surface of a measurement object from different perspectives;
B creating a three-dimensional measurement object model which comprises at least the measurement surface of the measurement object using the plurality of spatially resolved images of the measurement surface;
C providing a relative beam position image recording unit and recording at least one spatially resolved relative beam position determination image of at least the measurement surface of the measurement object using the relative beam position image recording unit;

D determining a spatial position and orientation of the relative beam position image recording unit relative to the measurement object using the at least one spatially resolved relative beam position determination image in combination with at least one of the three-dimensional measurement object model or the plurality of spatially resolved measurement object images by comparing the at least one relative beam position determination image with views from different perspectives calculated using the three-dimensional measurement object model and assigning coordinates to the relative beam position image recording unit in the coordinate system of the measurement object model;

E providing a spatial relation between the spatial beam path of the measurement beam of the interferometric measurement apparatus and the position and orientation of the relative beam position image recording unit;

F determining the spatial beam path of the measurement beam of the interferometric measurement apparatus relative to the measurement object based on the spatial relation provided in method step E and the spatial position and orientation of the relative beam position image recording unit relative to the measurement object; and carrying out an interferometric measurement on the measurement object by the measurement beam and evaluating the interferometric measurement taking into account the path of the measurement beam.

14. A measurement apparatus for interferometric measurement of a measurement object, the measurement apparatus comprising:

one or more beam sources for generating at least one measurement beam and at least one reference beam, a detector, an evaluation unit connected to the detector and configured for evaluating measurement signals from the detector, wherein the measurement apparatus is configured to guide the measurement beam at at least one measurement point on the measurement object and to superimpose the measurement beam, that is at least partially reflected or scattered by the measurement object, and the reference beam on a detection surface of the detector such that at least one of a superimposition or interference signal between the measurement beam and the reference beam is measurable by the detector, a relative beam position image recording unit, and wherein the evaluation unit is further configured to determine a beam path of the measurement beam, and wherein the measurement apparatus is configured to A record a plurality of spatially resolved measurement object images of at least one measurement surface of the measurement object from different perspectives;

B create a three-dimensional measurement object model which comprises at least the measurement surface of the measurement object by the plurality of spatially resolved images of the measurement surface;

C record at least one spatially resolved relative beam position determination image of at least the measurement surface of the measurement object using the relative beam position image recording unit;

D determine a spatial position and orientation of the relative beam position image recording unit relative to the measurement object using the at least one spatially resolved relative beam position determination image in combination with at least one of the three-dimensional measurement object model or the plurality of spatially resolved measurement object images;

E provide a spatial relation between the spatial beam path of the measurement beam of the measurement apparatus and a position and orientation of the relative beam position image recording unit; and F determine the spatial beam path of the measurement beam of the measurement apparatus relative to the measurement object based on the relation provided in E and the spatial position and orientation of the relative beam position image recording unit relative to the measurement object.

* * * * *